(12) United States Patent
Tang et al.

(10) Patent No.: US 8,363,337 B2
(45) Date of Patent: Jan. 29, 2013

(54) IMAGING LENS ASSEMBLY

(75) Inventors: Hsiang Chi Tang, Taichung (TW);
Chun Shan Chen, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 257 days.

(21) Appl. No.: 12/823,713

(22) Filed: Jun. 25, 2010

(65) Prior Publication Data

US 2011/0249346 A1    Oct. 13, 2011

(30) Foreign Application Priority Data

Apr. 8, 2010   (TW) ............................... 99110860 A

(51) Int. Cl.
*G02B 9/60* (2006.01)
*G02B 13/18* (2006.01)

(52) U.S. Cl. ........................................ 359/764; 359/714
(58) Field of Classification Search .......... 359/763–764, 359/754–757, 771–773, 776–778, 713–714
See application file for complete search history.

(56) References Cited

U.S. PATENT DOCUMENTS

| 7,365,920 | B2 | 4/2008 | Noda | |
|---|---|---|---|---|
| 7,643,225 | B1 | 1/2010 | Tsai | |
| 7,864,454 | B1 * | 1/2011 | Tang et al. | 359/764 |
| 7,965,454 | B2 * | 6/2011 | Tanaka et al. | 359/754 |
| 2010/0220229 | A1 * | 9/2010 | Sano | 348/340 |
| 2010/0253829 | A1 * | 10/2010 | Shinohara | 348/340 |
| 2010/0254029 | A1 * | 10/2010 | Shinohara | 359/764 |
| 2011/0013069 | A1 * | 1/2011 | Chen | 348/335 |
| 2011/0115965 | A1 * | 5/2011 | Engelhardt et al. | 348/345 |
| 2011/0134305 | A1 * | 6/2011 | Sano et al. | 348/340 |

FOREIGN PATENT DOCUMENTS

| TW | M369459 | 11/2009 |
|---|---|---|
| WO | WO 2010/024198 | * 3/2010 |

* cited by examiner

*Primary Examiner* — Jordan Schwartz
(74) *Attorney, Agent, or Firm* — Morris, Manning & Martin, LLP; Tim Tingkang Xia, Esq.

(57) ABSTRACT

This invention provides an imaging lens assembly including five lens elements with refractive power, in order from an object side toward an image side: a first lens with positive refractive power having a convex object-side surface, a second lens with negative refractive power, a third lens having a concave object-side surface, a fourth lens with positive refractive power having an object-side surface and a convex image-side surface, and at least one of both surfaces thereof being aspheric, a fifth lens with negative refractive power having a concave image-side surface with at least one inflection point formed thereon. An aperture stop is positioned between an imaged object and the second lens. The imaging lens assembly further comprises an electronic sensor on which an object is imaged. With such arrangement, the size and the optical sensitivity of the lens assembly can be reduced. A high image resolution is also obtained.

23 Claims, 25 Drawing Sheets

| TABLE 1 | | | | | | |
|---|---|---|---|---|---|---|
| (Embodiment 1) | | | | | | |
| f = 4.34 mm, Fno = 2.85, HFOV = 33.2 deg. | | | | | | |
| Surface # | | Curvature Radius | Thickness | Material | Index | Abbe # | Focal length |
| 0 | Object | Plano | Infinity | | | | |
| 1 | Lens 1 | 1.424400 (ASP) | 0.562 | Plastic | 1.544 | 55.9 | 2.55 |
| 2 | | -43.791100 (ASP) | -0.010 | | | | |
| 3 | Ape. Stop | Plano | 0.096 | | | | |
| 4 | Lens 2 | -15.543700 (ASP) | 0.351 | Plastic | 1.632 | 23.4 | -5.28 |
| 5 | | 4.287000 (ASP) | 0.559 | | | | |
| 6 | Lens 3 | -3.112200 (ASP) | 0.302 | Plastic | 1.632 | 23.4 | -26.30 |
| 7 | | -3.973100 (ASP) | 0.274 | | | | |
| 8 | Lens 4 | -3.011300 (ASP) | 0.790 | Plastic | 1.544 | 55.9 | 2.03 |
| 9 | | -0.881520 (ASP) | 0.250 | | | | |
| 10 | Lens 5 | -2.171820 (ASP) | 0.360 | Plastic | 1.530 | 55.8 | -1.73 |
| 11 | | 1.674970 (ASP) | 0.700 | | | | |
| 12 | IR-filter | Plano | 0.300 | Glass | 1.517 | 64.2 | - |
| 13 | | Plano | 0.334 | | | | |
| 14 | Image | Plano | | | | | |

Fig.7

| TABLE 2A | | | | | |
|---|---|---|---|---|---|
| Aspheric Coefficients | | | | | |
| Surface # | 1 | 2 | 4 | 5 | 6 |
| k = | -5.03747E+00 | -9.00000E+01 | -9.00000E+01 | 2.12386E+01 | -2.47567E+00 |
| A4 = | 2.14865E-01 | -5.07469E-02 | 9.34335E-03 | 3.54189E-02 | -1.85260E-01 |
| A6 = | -2.00756E-01 | 6.72433E-02 | 3.30155E-02 | 3.28807E-02 | -1.30889E-01 |
| A8 = | 2.35011E-01 | -2.65004E-01 | 2.41725E-01 | 1.03737E-01 | 3.47995E-01 |
| A10= | -2.26327E-01 | 3.66614E-01 | -9.28831E-01 | -2.81785E-01 | -4.39597E-01 |
| A12= | 3.78911E-02 | -2.95155E-01 | 1.42201E+00 | 4.36516E-01 | 3.31819E-01 |
| A14= | -1.40446E-02 | 7.10802E-02 | -7.15280E-01 | -1.65618E-01 | |
| Surface # | 7 | 8 | 9 | 10 | |
| k = | 1.30836E+00 | 2.54690E+00 | -3.55591E+00 | -2.10680E+01 | |
| A4 = | -1.07942E-01 | 8.04230E-03 | -6.26096E-02 | -1.85407E-02 | |
| A6 = | -9.36666E-02 | 3.84691E-02 | 9.50058E-02 | -2.83403E-02 | |
| A8 = | 1.46098E-01 | -2.24302E-01 | -1.17097E-01 | 1.23311E-02 | |
| A10= | -4.68426E-02 | 3.02684E-01 | 6.74457E-02 | -7.53760E-04 | |
| A12= | 2.44880E-02 | -1.70694E-01 | -1.72145E-02 | -2.09606E-04 | |
| A14= | | 3.64635E-02 | 1.49999E-03 | 2.15227E-05 | |

Fig.8A

| TABLE 2B | |
|---|---|
| Aspheric Coefficients | |
| Surface # | 11 |
| k = | -1.45741E+01 |
| A1 = | |
| A2 = | |
| A3 = | |
| A4 = | -5.89149E-02 |
| A5 = | |
| A6 = | 1.64455E-02 |
| A7 = | |
| A8 = | -5.94048E-03 |
| A9 = | |
| A10 = | 1.44523E-03 |
| A11 = | |
| A12 = | -2.18721E-04 |
| A13 = | |
| A14 = | 1.54195E-05 |

Fig.8B

| TABLE 3 | | | | | | |
|---|---|---|---|---|---|---|
| (Embodiment 2) | | | | | | |
| f = 4.19 mm, Fno = 2.60, HFOV = 34.0 deg. | | | | | | |
| Surface # | | Curvature Radius | Thickness | Material | Index | Abbe # | Focal length |
| 0 | Object | Plano | Infinity | | | | |
| 1 | Lens 1 | 1.571920 (ASP) | 0.676 | Plastic | 1.544 | 55.9 | 2.73 |
| 2 | | -23.121400 (ASP) | 0.048 | | | | |
| 3 | Ape. Stop | Plano | 0.022 | | | | |
| 4 | Lens 2 | 12.150700 (ASP) | 0.292 | Plastic | 1.650 | 21.4 | -5.81 |
| 5 | | 2.853260 (ASP) | 0.556 | | | | |
| 6 | Lens 3 | -6.283400 (ASP) | 0.326 | Plastic | 1.650 | 21.4 | -19.97 |
| 7 | | -12.432900 (ASP) | 0.258 | | | | |
| 8 | Lens 4 | -2.500840 (ASP) | 0.688 | Plastic | 1.544 | 55.9 | 2.55 |
| 9 | | -0.980050 (ASP) | 0.150 | | | | |
| 10 | Lens 5 | -11.177200 (ASP) | 0.681 | Plastic | 1.530 | 55.8 | -2.41 |
| 11 | | 1.469280 (ASP) | 0.700 | | | | |
| 12 | IR-filter | Plano | 0.300 | Glass | 1.517 | 64.2 | - |
| 13 | | Plano | 0.283 | | | | |
| 14 | Image | Plano | | | | | |

Fig.9

| TABLE 4A | | | | | |
|---|---|---|---|---|---|
| Aspheric Coefficients | | | | | |
| Surface # | 1 | 2 | 4 | 5 | 6 |
| k = | -6.50001E+00 | -1.00000E+00 | -1.00000E+00 | -7.60424E+00 | 0.00000E+00 |
| A4 = | 2.00906E-01 | -6.63627E-02 | -8.73985E-02 | -1.55910E-02 | -2.17817E-01 |
| A6 = | -1.82304E-01 | 1.64269E-01 | 2.18896E-01 | 9.85914E-02 | -1.49415E-01 |
| A8 = | 1.76311E-01 | -2.97652E-01 | -7.79705E-02 | -1.12267E-03 | 2.42150E-01 |
| A10= | -1.32426E-01 | 3.16695E-01 | -4.44971E-01 | -2.20387E-01 | -2.90155E-01 |
| A12= | 3.44944E-02 | -1.82173E-01 | 1.02314E+00 | 3.80280E-01 | 1.43366E-01 |
| A14= | 1.25591E-03 | 4.41557E-02 | -6.59333E-01 | -1.75174E-01 | |
| Surface # | 7 | 8 | 9 | 10 | |
| k = | 0.00000E+00 | 2.30246E+00 | -3.32916E+00 | -8.80951E+00 | |
| A4 = | -1.48716E-01 | 2.07187E-02 | -8.80091E-02 | -1.10587E-02 | |
| A6 = | -8.37144E-02 | 4.03194E-02 | 1.00182E-01 | -2.29816E-02 | |
| A8 = | 1.08256E-01 | -2.04141E-01 | -9.82521E-02 | 1.10219E-02 | |
| A10= | -2.95477E-02 | 3.06164E-01 | 6.46503E-02 | -1.04015E-03 | |
| A12= | 1.66616E-02 | -1.72754E-01 | -1.95080E-02 | -1.76243E-04 | |
| A14= | | 3.45768E-02 | 1.88250E-03 | 2.78399E-05 | |

Fig.10A

| TABLE 4B | |
|---|---|
| Aspheric Coefficients | |
| Surface # | 11 |
| k = | -9.60219E+00 |
| A1 = | |
| A2 = | |
| A3 = | |
| A4 = | -5.52140E-02 |
| A5 = | |
| A6 = | 1.78677E-02 |
| A7 = | |
| A8 = | -6.88010E-03 |
| A9 = | |
| A10 = | 1.53372E-03 |
| A11 = | |
| A12 = | -1.91127E-04 |
| A13 = | |
| A14 = | 1.05203E-05 |

Fig.10B

| TABLE 5 | | | | | | |
|---|---|---|---|---|---|---|
| (Embodiment 3) | | | | | | |
| f = 4.35 mm, Fno = 2.80, HFOV = 33.2 deg. | | | | | | |
| Surface # | | Curvature Radius | Thickness | Material | Index | Abbe # | Focal length |
| 0 | Object | Plano | Infinity | | | | |
| 1 | Lens 1 | 1.421730 (ASP) | 0.636 | Plastic | 1.544 | 55.9 | 2.45 |
| 2 | | -18.098000 (ASP) | 0.016 | | | | |
| 3 | Ape. Stop | Plano | 0.078 | | | | |
| 4 | Lens 2 | -14.976300 (ASP) | 0.300 | Plastic | 1.632 | 23.4 | -4.32 |
| 5 | | 3.368400 (ASP) | 0.483 | | | | |
| 6 | Lens 3 | -5.243800 (ASP) | 0.302 | Plastic | 1.632 | 23.4 | -76.12 |
| 7 | | -6.016600 (ASP) | 0.320 | | | | |
| 8 | Lens 4 | -1.873900 (ASP) | 0.665 | Plastic | 1.544 | 55.9 | 2.72 |
| 9 | | -0.930010 (ASP) | 0.220 | | | | |
| 10 | Lens 5 | 24.743600 (ASP) | 0.401 | Plastic | 1.530 | 55.8 | -2.43 |
| 11 | | 1.217630 (ASP) | 0.700 | | | | |
| 12 | IR-filter | Plano | 0.300 | Glass | 1.517 | 64.2 | - |
| 13 | | Plano | 0.460 | | | | |
| 14 | Image | Plano | | | | | |

Fig.11

| TABLE 6A | | | | | |
|---|---|---|---|---|---|
| Aspheric Coefficients | | | | | |
| Surface # | 1 | 2 | 4 | 5 | 6 |
| k = | -5.26517E+00 | -1.00000E+01 | 1.00000E+00 | -6.82413E-01 | 0.00000E+00 |
| A4 = | 2.15207E-01 | -6.79263E-02 | -2.04501E-02 | 2.93137E-02 | -2.72749E-01 |
| A6 = | -1.82036E-01 | 1.18010E-01 | 2.01484E-01 | 1.76780E-01 | -1.33984E-01 |
| A8 = | 1.62877E-01 | -2.55074E-01 | -5.45787E-02 | -1.54056E-01 | 3.11282E-01 |
| A10= | -1.39998E-01 | 3.17407E-01 | -4.92283E-01 | 2.87216E-03 | -5.08400E-01 |
| A12= | 2.64129E-02 | -2.73173E-01 | 1.11138E+00 | 3.36307E-01 | 2.56690E-01 |
| A14= | -6.48581E-03 | 1.05820E-01 | -6.96535E-01 | -1.70744E-01 | |
| Surface # | 7 | 8 | 9 | 10 | |
| k = | 0.00000E+00 | 6.51876E-01 | -3.67070E+00 | 9.99629E-01 | |
| A4 = | -2.19697E-01 | 1.77486E-02 | -7.16624E-02 | -1.99381E-02 | |
| A6 = | -1.64572E-02 | 6.59271E-02 | 1.07323E-01 | -2.91861E-02 | |
| A8 = | 9.06411E-02 | -2.06221E-01 | -1.15810E-01 | 1.19631E-02 | |
| A10= | -6.21708E-02 | 3.01437E-01 | 6.69969E-02 | -8.02955E-04 | |
| A12= | 5.70379E-02 | -1.75580E-01 | -1.75127E-02 | -2.24956E-04 | |
| A14= | | 3.71142E-02 | 1.33893E-03 | 2.94410E-05 | |

Fig.12A

| TABLE 6B | |
|---|---|
| Aspheric Coefficients | |
| Surface # | 11 |
| k = | -8.93377E+00 |
| A1 = | |
| A2 = | |
| A3 = | |
| A4 = | -6.26500E-02 |
| A5 = | |
| A6 = | 1.54085E-02 |
| A7 = | |
| A8 = | -5.76500E-03 |
| A9 = | |
| A10 = | 1.43824E-03 |
| A11 = | |
| A12 = | -2.09108E-04 |
| A13 = | |
| A14 = | 1.43252E-05 |

Fig.12B

| TABLE 7 | | | | | | | |
|---|---|---|---|---|---|---|---|
| (Embodiment 4) | | | | | | | |
| f = 4.33 mm, Fno = 2.60, HFOV = 33.2 deg. | | | | | | | |
| Surface # | | Curvature Radius | Thickness | Material | Index | Abbe # | Focal length |
| 0 | Object | Plano | Infinity | | | | |
| 1 | Lens 1 | 1.396360 (ASP) | 0.708 | Plastic | 1.544 | 55.9 | 2.88 |
| 2 | | 10.488800 (ASP) | 0.072 | | | | |
| 3 | Ape. Stop | Plano | 0.032 | | | | |
| 4 | Lens 2 | 10.467100 (ASP) | 0.270 | Plastic | 1.650 | 21.4 | -5.22 |
| 5 | | 2.535670 (ASP) | 0.465 | | | | |
| 6 | Lens 3 | -14.285700 (ASP) | 0.302 | Plastic | 1.650 | 21.4 | 29.01 |
| 7 | | -8.193500 (ASP) | 0.324 | | | | |
| 8 | Lens 4 | -2.028110 (ASP) | 0.738 | Plastic | 1.544 | 55.9 | 3.24 |
| 9 | | -1.064940 (ASP) | 0.144 | | | | |
| 10 | Lens 5 | 9.881400 (ASP) | 0.513 | Plastic | 1.530 | 55.8 | -2.91 |
| 11 | | 1.309360 (ASP) | 0.700 | | | | |
| 12 | IR-filter | Plano | 0.300 | Glass | 1.517 | 64.2 | - |
| 13 | | Plano | 0.414 | | | | |
| 14 | Image | Plano | | | | | |

Fig.13

| TABLE 8A | | | | | |
|---|---|---|---|---|---|
| Aspheric Coefficients | | | | | |
| Surface # | 1 | 2 | 4 | 5 | 6 |
| k = | -5.00633E+00 | -1.00000E+00 | -1.00000E+00 | -7.49719E+00 | 0.00000E+00 |
| A4 = | 2.32204E-01 | -7.35021E-02 | -1.28418E-01 | 1.00889E-02 | -1.52207E-01 |
| A6 = | -1.58394E-01 | 1.39743E-01 | 2.25881E-01 | 1.77925E-01 | -1.10405E-01 |
| A8 = | 1.73248E-01 | -2.03752E-01 | -1.65227E-02 | -4.27130E-02 | 2.18028E-01 |
| A10= | -1.22634E-01 | 3.14988E-01 | -5.50431E-01 | -1.57746E-01 | -2.75464E-01 |
| A12= | 5.87457E-02 | -3.54165E-01 | 1.02314E+00 | 3.84135E-01 | 1.27539E-01 |
| A14= | -1.23741E-02 | 1.71260E-01 | -6.59499E-01 | -1.74964E-01 | |
| Surface # | 7 | 8 | 9 | 10 | |
| k = | 0.00000E+00 | 9.18047E-01 | -4.22959E+00 | -6.41687E+00 | |
| A4 = | -9.71476E-02 | 7.01281E-02 | -5.12756E-02 | -3.34585E-02 | |
| A6 = | -8.11331E-02 | 2.92123E-02 | 7.23839E-02 | -2.38064E-02 | |
| A8 = | 1.07277E-01 | -2.10911E-01 | -9.95429E-02 | 1.07164E-02 | |
| A10= | -4.27833E-02 | 3.08682E-01 | 6.60561E-02 | -9.57510E-04 | |
| A12= | 1.05082E-02 | -1.72128E-01 | -1.93006E-02 | -1.71937E-04 | |
| A14= | | 3.42333E-02 | 1.89104E-03 | 2.66446E-05 | |

Fig.14A

| TABLE 8B | |
|---|---|
| Aspheric Coefficients | |
| Surface # | 11 |
| k = | -8.50861E+00 |
| A1 = | |
| A2 = | |
| A3 = | |
| A4 = | -5.34583E-02 |
| A5 = | |
| A6 = | 1.42727E-02 |
| A7 = | |
| A8 = | -5.88607E-03 |
| A9 = | |
| A10 = | 1.47381E-03 |
| A11 = | |
| A12 = | -2.07677E-04 |
| A13 = | |
| A14 = | 1.25263E-05 |

Fig.14B

| TABLE 9 | | | | | | |
|---|---|---|---|---|---|---|
| (Embodiment 5) | | | | | | |
| f = 4.30 mm, Fno = 2.80, HFOV = 33.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.237 | | | | |
| 2 | Lens 1 | 1.257430 (ASP) | 0.607 | Plastic | 1.544 | 55.9 | 2.18 |
| 3 | | -17.382200 (ASP) | 0.085 | | | | |
| 4 | Lens 2 | -5.890300 (ASP) | 0.280 | Plastic | 1.650 | 21.4 | -4.25 |
| 5 | | 5.297300 (ASP) | 0.427 | | | | |
| 6 | Lens 3 | -4.889000 (ASP) | 0.325 | Plastic | 1.650 | 21.4 | -53.79 |
| 7 | | -5.833000 (ASP) | 0.417 | | | | |
| 8 | Lens 4 | -2.060770 (ASP) | 0.381 | Plastic | 1.544 | 55.9 | 5.06 |
| 9 | | -1.254960 (ASP) | 0.241 | | | | |
| 10 | Lens 5 | -4.149800 (ASP) | 0.717 | Plastic | 1.530 | 55.8 | -2.69 |
| 11 | | 2.307850 (ASP) | 0.500 | | | | |
| 12 | IR-filter | Plano | 0.300 | Glass | 1.517 | 64.2 | - |
| 13 | | Plano | 0.203 | | | | |
| 14 | Image | Plano | | | | | |

Fig.15

| TABLE 10A | | | | | |
|---|---|---|---|---|---|
| Aspheric Coefficients | | | | | |
| Surface # | 2 | 3 | 4 | 5 | 6 |
| k = | -4.16503E+00 | -1.00000E+00 | -1.00000E+00 | 1.00000E+00 | 0.00000E+00 |
| A4 = | 2.52514E-01 | -4.73140E-02 | 1.80336E-02 | 6.06816E-02 | -2.78926E-01 |
| A6 = | -1.56241E-01 | 1.31073E-01 | 2.13945E-01 | 1.35275E-01 | -7.86865E-02 |
| A8 = | 1.11054E-01 | -3.37418E-01 | -2.33519E-01 | 5.47458E-02 | 1.32807E-01 |
| A10= | -1.77887E-01 | 2.19568E-01 | -3.31830E-01 | -2.44028E-01 | 3.68821E-03 |
| A12= | 4.83160E-01 | 6.99161E-02 | 1.13289E+00 | 9.95190E-02 | -1.21131E-01 |
| A14= | -6.49618E-01 | -2.57807E-01 | -7.66733E-01 | 5.77923E-01 | |
| A16= | 0.00000E+00 | | | | |
| A18= | 2.07000E-01 | | | | |
| Surface # | 7 | 8 | 9 | 10 | |
| k = | 0.00000E+00 | -3.25031E-01 | -3.71937E+00 | -1.00325E+00 | |
| A4 = | -2.28580E-01 | -3.21544E-02 | 1.35154E-02 | 1.19929E-02 | |
| A6 = | -6.31907E-03 | 5.63934E-04 | 5.46366E-02 | -2.28009E-02 | |
| A8 = | 8.72537E-02 | -2.05601E-01 | -1.01751E-01 | 1.06486E-02 | |
| A10= | -5.79243E-03 | 2.95230E-01 | 6.73690E-02 | -1.09325E-03 | |
| A12= | 4.85584E-02 | -1.76582E-01 | -1.86841E-02 | -1.81772E-04 | |
| A14= | | 4.43478E-02 | 1.61631E-03 | 3.01233E-05 | |

Fig.16A

| TABLE 10B | |
|---|---|
| Aspheric Coefficients | |
| Surface # | 11 |
| k = | -1.82664E+01 |
| A1 = | |
| A2 = | |
| A3 = | |
| A4 = | -5.34936E-02 |
| A5 = | |
| A6 = | 1.18156E-02 |
| A7 = | |
| A8 = | -5.74831E-03 |
| A9 = | |
| A10 = | 1.55616E-03 |
| A11 = | |
| A12 = | -2.34573E-04 |
| A13 = | |
| A14 = | 1.52092E-05 |

Fig.16B

| TABLE 11 | | | | | | |
|---|---|---|---|---|---|---|
| (Embodiment 6) | | | | | | |
| f = 4.20 mm, Fno = 2.80, HFOV = 34.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.220 | | | | |
| 2 | Lens 1 | 1.316260 (ASP) | 0.523 | Plastic | 1.544 | 55.9 | 2.62 |
| 3 | | 14.534000 (ASP) | 0.061 | | | | |
| 4 | Lens 2 | 7.019500 (ASP) | 0.280 | Plastic | 1.650 | 21.4 | -5.72 |
| 5 | | 2.391790 (ASP) | 0.469 | | | | |
| 6 | Lens 3 | -2.641690 (ASP) | 0.323 | Plastic | 1.544 | 55.9 | 26.23 |
| 7 | | -2.325110 (ASP) | 0.245 | | | | |
| 8 | Lens 4 | -1.588400 (ASP) | 0.543 | Plastic | 1.544 | 55.9 | 5.15 |
| 9 | | -1.135790 (ASP) | 0.636 | | | | |
| 10 | Lens 5 | -4.887700 (ASP) | 0.400 | Plastic | 1.544 | 55.9 | -2.95 |
| 11 | | 2.460040 (ASP) | 0.500 | | | | |
| 12 | IR-filter | Plano | 0.300 | Glass | 1.517 | 64.2 | - |
| 13 | | Plano | 0.302 | | | | |
| 14 | Image | Plano | | | | | |

Fig.17

| TABLE 12A | | | | | |
|---|---|---|---|---|---|
| Aspheric Coefficients | | | | | |
| Surface # | 2 | 3 | 4 | 5 | 6 |
| k = | -4.08671E+00 | -1.00000E+00 | -1.00000E+00 | -6.37628E+00 | 0.00000E+00 |
| A4 = | 2.27279E-01 | -1.74239E-01 | -2.09727E-01 | 8.91131E-03 | -1.78188E-01 |
| A6 = | -1.27123E-01 | 3.64308E-01 | 4.51316E-01 | 2.71747E-01 | -8.02245E-02 |
| A8 = | 1.42039E-01 | -5.36251E-01 | -1.83316E-01 | -7.59948E-02 | 4.85349E-01 |
| A10= | -3.20230E-01 | 6.38368E-01 | -3.82148E-01 | 1.11837E-01 | -3.55472E-01 |
| A12= | 7.15413E-01 | -8.11801E-01 | 3.80411E-01 | 5.39964E-02 | 1.98246E-01 |
| A14= | -7.65740E-01 | 3.07833E-01 | -1.18724E-01 | 7.43244E-02 | |
| A16= | 0.00000E+00 | | | | |
| A18= | 2.07000E-01 | | | | |
| Surface # | 7 | 8 | 9 | 10 | |
| k = | 0.00000E+00 | 7.14887E-01 | -2.64319E+00 | 1.00000E+00 | |
| A4 = | -4.68181E-02 | 1.55372E-01 | -1.85691E-02 | -3.48270E-02 | |
| A6 = | 1.76791E-03 | 6.82914E-02 | 7.08880E-02 | -1.60463E-02 | |
| A8 = | 1.20073E-01 | -1.88479E-01 | -9.23223E-02 | 1.14931E-02 | |
| A10= | 4.74770E-02 | 2.75548E-01 | 6.89068E-02 | -1.13596E-03 | |
| A12= | -6.80992E-02 | -1.75047E-01 | -2.01860E-02 | -2.18294E-04 | |
| A14= | | 4.60463E-02 | 1.07214E-03 | 3.28237E-05 | |

Fig.18A

| TABLE 12B | |
|---|---|
| Aspheric Coefficients | |
| Surface # | 11 |
| k = | -1.44713E+01 |
| A1 = | |
| A2 = | |
| A3 = | |
| A4 = | -7.55231E-02 |
| A5 = | |
| A6 = | 2.09199E-02 |
| A7 = | |
| A8 = | -7.50029E-03 |
| A9 = | |
| A10 = | 1.80991E-03 |
| A11 = | |
| A12 = | -2.51370E-04 |
| A13 = | |
| A14 = | 1.48859E-05 |

Fig.18B

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 4.34 | 4.19 | 4.35 | 4.33 | 4.30 | 4.20 |
| Fno | 2.85 | 2.60 | 2.80 | 2.60 | 2.80 | 2.80 |
| HFOV | 33.2 | 34.0 | 33.2 | 33.2 | 33.5 | 34.0 |
| V1-V2 | 32.5 | 34.5 | 32.5 | 34.5 | 34.5 | 34.5 |
| V1-((V1+V2+V3)/3) | 21.7 | 23.0 | 21.7 | 23.0 | 23.0 | 11.5 |
| f1/f | 0.59 | 0.65 | 0.56 | 0.67 | 0.51 | 0.62 |
| f1/f4 | 1.26 | 1.07 | 0.90 | 0.89 | 0.43 | 0.51 |
| R1/f | 0.33 | 0.38 | 0.33 | 0.32 | 0.29 | 0.31 |
| (CT2/f)*10 | 0.81 | 0.70 | 0.69 | 0.62 | 0.65 | 0.67 |
| (T12/f)*10 | 0.20 | 0.17 | 0.22 | 0.24 | 0.20 | 0.15 |
| Td/f | 0.81 | 0.88 | 0.79 | 0.82 | 0.81 | 0.83 |
| SL/TTL | 0.88 | 0.85 | 0.86 | 0.84 | 0.95 | 0.95 |
| TTL/ImgH | 1.67 | 1.71 | 1.67 | 1.71 | 1.53 | 1.57 |

Fig.19

IMAGING LENS ASSEMBLY

BACKGROUND OF THE INVENTION

1. Field of the Invention

The present invention relates to an imaging lens assembly, and more particularly, to a compact imaging lens assembly used in portable electronic devices.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional imaging lens assembly for mobile phone cameras, such as the one disclosed in U.S. Pat. No. 7,365,920, generally comprises four lens elements and an aperture stop disposed in front of the four lens elements, wherein two spherical-surface glass lenses are used as the first and second lens elements, and being adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of making the glass lenses adhered together is complicated, posing difficulties in manufacture. In addition, a four independent lens elements optical system is disclosed by U.S. Pat. No. 7,643,225, comprising multiple aspheric lens elements, which effectively shortens the total track length and obtains high image quality.

However, due to the popularity of high standard mobile devices such as smart phones and PDAs (Personal Digital Assistant) driving the rapid improvements in high resolution and image quality of the current compact imaging lens systems, conventional four lens elements systems no longer satisfy the higher level camera modules. Furthermore, with the current trend for high performance and compact design in electronic products, the need for high resolution and high performance compact imaging lens assembly is very crucial in high level electronics development.

Therefore, a need exists in the art for an imaging lens assembly that features better image quality, maintains a moderate total track length and is applicable to compact portable electronic products.

SUMMARY OF THE INVENTION

The present invention provides an imaging lens assembly comprising: in order from an object side to an image side: a first lens element with positive refractive power having a convex object-side surface; a second lens element with negative refractive power; a third lens element having a concave object-side surface,; a fourth lens element with positive refractive power having a convex image-side surface, at least one of the object-side and image-side surfaces thereof being aspheric; and a fifth lens element with negative refractive power having a concave image-side surface on which at least one inflection point is formed; wherein the imaging lens assembly further comprises an aperture stop and an electronic sensor for image formation, wherein the aperture stop is disposed between the imaged object and the second lens element; and wherein the distance on the optical axis between the aperture stop and the electronic sensor is SL, the distance on the optical axis between the object-side surface of the first lens element and the electronic sensor is TTL, and they satisfy the relation: $0.75 < SL/TTL < 1.20$.

According to another aspect of the present invention, an imaging lens assembly comprises, in order from an object side to an image side: a first lens element with positive refractive power having a convex object-side surface; a second lens element with negative refractive power having a concave image-side surface; a third lens element having a concave object-side surface and a convex image-side surface; a fourth lens element with positive refractive power having a concave object-side surface and a convex image-side surface, both of the object-side and image-side surfaces thereof being aspheric; a fifth lens element with negative refractive power having a concave image-side surface on which at least one inflection point is formed, both of the object-side and image-side surfaces thereof being aspheric; wherein there is an air distance between the first lens element and the second lens element; wherein the air distance on the optical axis between the first lens element and the second lens element is T12, the focal length of the imaging lens assembly is f, and they satisfy the relation: $0.05 < (T12/f)*10 < 0.85$.

Such an arrangement of optical elements can reduce the size as well as the sensitivity of the imaging lens assembly and enables the lens assembly to obtain higher resolution.

In the present imaging lens assembly, the first lens element has positive refractive power so that the total track length of the imaging lens assembly can be effectively reduced; the second lens element has negative refractive power so that the aberration generated from the positive refractive power of the first lens element and the chromatic aberration of the system can be favorably corrected; the third lens element can have either negative or positive refractive power; when the third lens element has negative refractive power, the Petzval Sum of the system can be corrected effectively and the peripheral image plane becomes flatter; when the third lens element has positive refractive power, the high order aberration of the system can be favorably corrected; the fourth lens element with positive refractive power can effectively distribute positive refractive power contributed by the first lens element in order to mitigate the sensitivity of the system; the fifth lens element with negative refractive power can place the principal point of the optical system away from the image plane, reducing the total track length in order to maintain a compact imaging lens system.

In the present imaging lens assembly, the first lens element may be a bi-convex lens element or a meniscus lens element having a convex object-side surface and a concave image-side surface. When the first lens element is a bi-convex lens element, the refractive power thereof can be effectively enhanced, thus allowing a shortening of the total track length of the imaging lens assembly. When the first lens element is a meniscus lens element, the astigmatism of the system can be corrected more favorably. The second lens element has a concave object-side surface so as to favorably extend the back focal length of the system, thereby providing sufficient space to accommodate other components. The third lens element has a concave object-side surface so as to facilitate the correction of the astigmatism and high order aberrations of the system. Moreover, the third lens element preferably has a concave object-side surface and a convex image-side surface; and the fourth lens element has a convex image-side surface and can effectively reduce the incident angle of the system on the electronic sensor and increase the photo sensitivity of the system; preferably, the fourth lens element has a concave object-side surface and a convex image-side surface, which can effectively correct the aberration of the system at the same time; the fifth lens element has a concave image-side surface so that the principal point of the system can be away from the image plane, and the total track length of the system can be reduced, in order to maintain the compact size of the lens assembly; preferably, the fifth lens element has a concave object-side surface and a concave image-side surface.

In the aforementioned imaging lens assembly, the aperture stop can be disposed between the imaged object and the first lens element or between the first lens element and the second lens element. The first lens element provides positive refractive power, and the aperture stop is disposed near the object side of the imaging lens assembly, thereby the total track length of the imaging lens assembly can be reduced effectively. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the fifth lens element is provided with at least one inflection point, thereby the angle at which the light is projected onto the sensor from the off-axis field can be effectively reduced to further correct the off-axis aberrations. In addition, when the aperture stop is disposed closer to the second lens elements, a wide field of view can be favorably achieved. Such stop placement facilitates the correction of the distortion and chromatic aberration of magnification, and the mitigation of the system's sensitivity. Therefore, in the present imaging lens assembly, the aperture stop is placed between the imaged object and the second lens element for the purpose of achieving a balance between the telecentric feature and wide field of view of the imaging lens assembly; when the aperture stop is disposed between the imaged object and the first lens element, telecentric feature of the system is emphasized and the total track length can be shortened; when the aperture stop is disposed between the first lens element and the second lens element, the wide field of view is emphasized and the sensitivity of the system can be effectively reduced.

BRIEF DESCRIPTION OF THE DRAWINGS

FIG. 7 is TABLE 1 which lists the optical data of the first embodiment.

FIGS. 8A and 8B are TABLES 2A and 2B which list the aspheric surface data of the first embodiment.

FIG. 9 is TABLE 3 which lists the optical data of the second embodiment.

FIGS. 10A and 10B are TABLES 4A and 4B which list the aspheric surface data of the second embodiment.

FIG. 11 is TABLE 5 which lists the optical data of the third embodiment.

FIGS. 12A and 12B are TABLES 6A and 6B which list the aspheric surface data of the third embodiment.

FIG. 13 is TABLE 7 which lists the optical data of the fourth embodiment.

FIGS. 14A and 14B are TABLES 8A and 8B which list the aspheric surface data of the fourth embodiment.

FIG. 15 is TABLE 9 which lists the optical data of the fifth embodiment.

FIGS. 16A and 16B are TABLES 10A and 10B which list the aspheric surface data of the fifth embodiment.

FIG. 17 is TABLE 11 which lists the optical data of the sixth embodiment.

FIGS. 18A and 18B are TABLES 12A and 12B which list the aspheric surface data of the sixth embodiment.

FIG. 19 is TABLE 13 which lists the data of the respective embodiments resulting from the equations.

DETAILED DESCRIPTION OF THE PREFERRED EMBODIMENTS

Figure 1A:
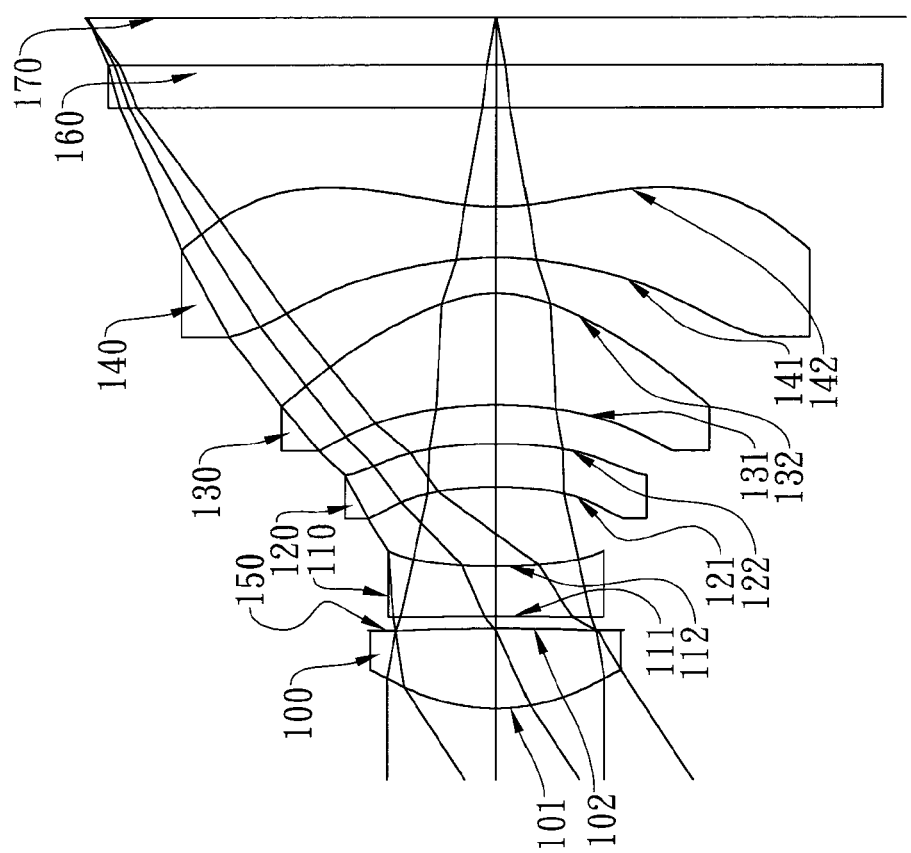
FIG. 1A shows an imaging lens assembly in accordance with a first embodiment of the present invention.

The present invention provides an imaging lens assembly comprising, in order from the object side to the image side: a first lens element with positive refractive power having a convex object-side surface; a second lens element with negative refractive power; a third lens element having a concave object-side surface; and a fourth lens element with positive refractive power having a convex image-side surface, at least one of the object-side and image-side surfaces thereof being aspheric ; a fifth lens element with negative refractive power having a concave image-side surface on which at least one inflection point is formed; wherein the imaging lens assembly further comprises an aperture stop and an electronic sensor for image formation; wherein the aperture stop is disposed between the imaged object and the second lens element; and wherein the distance on the optical axis between the aperture stop and the electronic sensor is SL, the distance on the optical axis between the object-side surface of the first lens element and the electronic sensor is TTL, and they satisfy the relation: 0.75<SL/TTL<1.20.

When the aforementioned imaging lens assembly satisfies the above relation: 0.75<SL/TTL<1.20, the imaging lens assembly can obtain a good balance between the telecentric feature and wide field of view; preferably, the aperture stop is disposed between the first lens element and the second lens element, and they satisfy the relation: 0.75<SL/TTL<0.92.

In the aforementioned imaging lens assembly, it is preferable that the second lens element has a concave image-side surface so as to effectively increase the back focal distance in order to obtain enough space for additional components; preferably, the fourth lens element has a concave object-side surface; wherein a meniscus fourth lens element having a concave object-side surface and a convex image-side surface can favorably correct the aberration of the system; preferably, the fifth lens element has a concave object-side surface; wherein a bi-concave fifth lens element can place the principal point of the optical system further away from the image plane, which reduces the total track length of the system in order to stay compact.

In the aforementioned imaging lens assembly, it is preferable that the object-side and image-side surfaces of the fifth lens elements are aspheric. Aspheric surfaces can be easily made into non-spherical profiles, allowing more design parameter freedom which can be used to reduce aberrations and the number of the lens elements, so that the total track length of the imaging lens assembly can be effectively reduced; preferably, the fifth lens element is made of plastic material. Plastic material is favorable for the reduction in the weight of the lens assembly and also in the production cost.

In the aforementioned imaging lens assembly, the focal length of the first lens element is f1, the focal length of the imaging lens assembly is f, and they preferably satisfy the relation: $0.40 < f1/f < 0.80$. When the above relation is satisfied, the refractive power of the first lens element is more balanced so that the total track length of the system can be effectively controlled to keep the imaging lens assembly compact. The above relation also prevents the high order spherical aberration from becoming too large, so that the image quality can be improved. And preferably they satisfy the relation: $0.50 < f1/f < 0.70$.

In the aforementioned imaging lens assembly, the thickness on the optical axis of the second lens element is CT2, the focal length of the imaging lens assembly is f, and they preferably satisfy the relation: $0.30 < (CT2/f)*10 < 1.00$. When the above relation is satisfied, the thickness of the second lens element is appropriate when trying to achieve a good balance between the manufacturing yield and the correction of the system aberration.

In the aforementioned imaging lens assembly, the Abbe number of the first lens element is V1, the Abbe number of the second lens element is V2, and they preferably satisfy the relation: $25.0 < V1 - V2 < 45.0$. The above relation facilitates the correction of the chromatic aberration of the imaging lens assembly. And it will be more preferable that V1 and V2 satisfy the relation: $30.0 < V1 - V2 < 42.0$.

In the aforementioned imaging lens assembly, the radius of curvature of the object-side surface of the first lens element is R1, the focal length of the imaging lens assembly is f, and they preferably satisfy the relation: $0.25 < R1/f < 0.45$. When the above relation is satisfied, the first lens element is provided with sufficient positive refractive power while preventing high order aberration from becoming too large.

In the aforementioned imaging lens assembly, the focal length of the first lens element is f1, the focal length of the fourth lens element is f4, and they preferably satisfy the relation: $0.80 < f1/f4 < 1.40$. When the above relation is satisfied, the distribution of refractive power from the first lens element and the fourth lens element is more balanced, which reduces the sensitivity of the system and the generation of aberration.

In the aforementioned imaging lens assembly, with air distance between the first lens element and the second lens element, the distance on the optical axis between the first and second lens elements is T12, the focal length of the imaging lens assembly is f, and they preferably satisfy the relation: $0.05 < (T12/f)*10 < 0.85$. When the above relation is satisfied, the distance on the optical axis between the first lens element and the second lens element is more appropriate, which avoids the difficulties of lens element insertion due to overly tight spacing or maintaining compact size due to overly large spacing.

In the aforementioned imaging lens assembly, the Abbe number of the first lens element is V1, the Abbe number of the second lens element is V2, the Abbe number of the third lens element is V3, and they preferably satisfy the relation: $15.0 < V1 - ((V1+V2+V3)/3) < 30.0$. When the above relation is satisfied, the correction of the chromatic aberration of the imaging lens assembly is even more favorable in order to increase the resolution of the system.

In the aforementioned imaging lens assembly, the distance on the optical axis between the object-side surface of the first lens element and the image-side surface of the fifth lens element is Td, the focal length of the imaging lens assembly is f, and they preferably satisfy the relation: $0.70 < Td/f < 1.00$. When the above relation is satisfied, the lens elements are placed closer together in order to maintain the compact size of the imaging lens system.

In the aforementioned imaging lens assembly, the distance on the optical axis between the object-side surface of the first lens element and the electronic sensor is TTL, half of the diagonal length of the effective pixel area of the electronic sensor is ImgH, and they preferably satisfy the relation: $TTL/ImgH < 1.95$. The above relation enables the imaging lens assembly to maintain a compact form so that it can be installed in compact portable electronic products.

The present invention provides another imaging lens assembly comprising, in order from the object side to the image side: a first lens element with positive refractive power having a convex object-side surface; a second lens element with negative refractive power having a concave image-side surface; a third lens element having a concave object-side surface and a convex image-side surface; a fourth lens element with positive refractive power having a concave object-side surface and a convex image-side surface, both of the object-side and image-side surfaces thereof being aspheric; and a fifth lens element with negative refractive power having a concave image-side surface on which at least one inflection point is formed, both of the object-side and image-side surfaces thereof being aspheric; wherein there is an air distance between the first lens element and the second lens element, and the distance on the optical axis between the first lens element and the second lens element is T12, the focal length of the imaging lens assembly is f, and they satisfy the relation: $0.05 < (T12/f)*10 < 0.85$.

When the aforementioned imaging lens assembly satisfies the relation: $0.05 < (T12/f)*10 < 0.85$, the air distance on the optical axis between the first lens element and the second lens element is more appropriate for avoiding difficulties lens element insertions due to overly tight spacing or maintaining the compact size of the lens assembly due to overly large spacing.

In the aforementioned imaging lens assembly, it is preferable that the fifth lens element has a concave image-side surface, which makes the fifth lens element a bi-concave lens element, so as to move the principal point of the optical system further away from the image plane, in order to reduce the total track length of the system and maintain the compact size of the system.

In the aforementioned imaging lens assembly, the fifth lens element is made of plastic material. Plastic material is favorable for the reduction in weight of the lens assembly and also the production cost.

In the aforementioned imaging lens assembly, the radius of curvature of the object-side surface of the first lens element is R1, the focal length of the imaging lens assembly is f, and they preferably satisfy the relation: $0.25 < R1/f < 0.45$. When the above relation is satisfied, the first lens element is provided with sufficient refractive power while preventing high order aberration from becoming too large.

In the aforementioned imaging lens assembly, the thickness on the optical axis of the second lens element is CT2, the focal length of the imaging lens assembly is f, and they preferably satisfy the relation: $0.30<(CT2/f)*10<1.00$. When the above relation is satisfied, the thickness of the second lens element is appropriate when trying to achieve a balance between the manufacturing yield and the correction of the system aberration.

In the aforementioned imaging lens assembly, the Abbe number of the first lens element is V1, the Abbe number of the second lens element is V2, and they preferably satisfy the relation: $30.5<V1-V2<42.0$. When the above relation is satisfied, the chromatic aberration of the imaging lens assembly can be favorably corrected.

In the aforementioned imaging lens assembly, the Abbe number of the first lens element is V1, the Abbe number of the second lens element is V2, the Abbe number of the third lens element is V3, and they preferably satisfy the relation: $15.0<V1-((V1+V2+V3)/3)<30.0$. When the above relation is satisfied, the chromatic aberration can be further corrected in order to increase the resolution of the system.

In the aforementioned imaging lens assembly, the imaging lens assembly further comprises an aperture stop and an electronic sensor for image formation; wherein the aperture stop is disposed between the imaged object and the second lens element; and wherein the distance on the optical axis between the aperture stop and the electronic sensor is SL, the distance on the optical axis between the object-side surface of the first lens element and the electronic sensor is TTL, and they satisfy the relation: $0.75<SL/TTL<1.20$. When the above relation is satisfied, the imaging lens assembly can achieve a good balance between the telecentric feature and the wide field of view.

In the aforementioned imaging lens assembly, the imaging lens assembly further comprises an electronic sensor for image formation; wherein the distance on the optical axis between the object-side surface of the first lens element and the electronic sensor is TTL, half of the diagonal length of the effective pixel area of the electronic sensor is ImgH, and they preferably satisfy the relation: $TTL/ImgH<1.95$. When the above relation is satisfied, the imaging lens assembly can maintain a compact form so that it can be installed in compact portable electronic products.

In the present imaging lens assembly, the lens elements can be made of glass or plastic material. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be effectively reduced and the image quality can be improved as well.

In the present imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
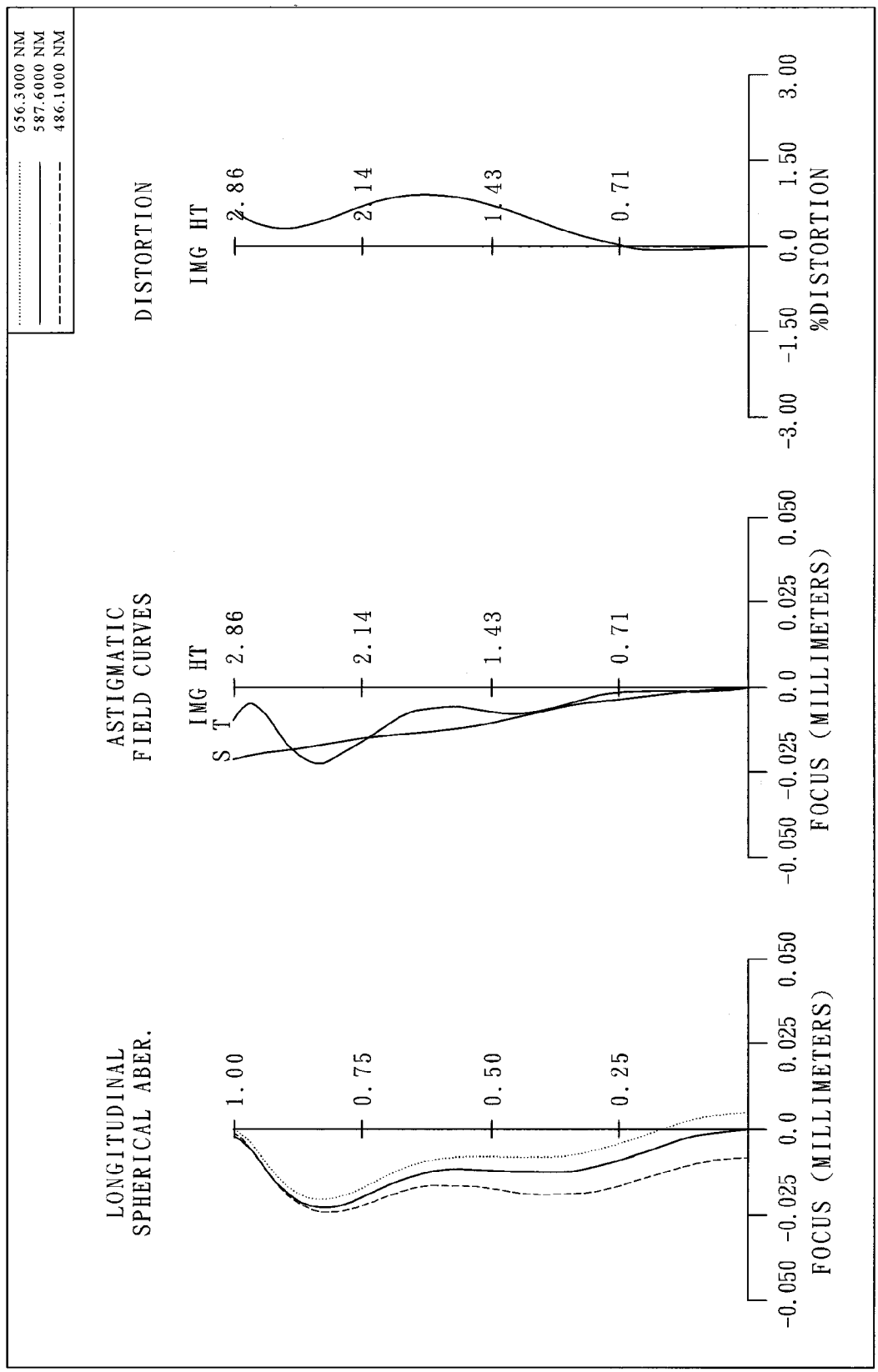
FIG. 1B shows the aberration curves of the first embodiment of the present invention.

FIG. 1A shows an imaging lens assembly in accordance with a first embodiment of the present invention, and FIG. 1B shows the aberration curves of the first embodiment of the present invention. The imaging lens assembly of the first embodiment of the present invention mainly comprises five lens elements, in order from the object side to the image side: a plastic first lens element 100 with positive refractive power having a convex object-side surface 101 and a convex image-side surface 102, the object-side and image-side surfaces 101 and 102 thereof being aspheric; a plastic second lens element 110 with negative refractive power having a concave object-side surface 111 and a concave image-side surface 112, the object-side and image-side surfaces 111 and 112 thereof being aspheric; a plastic third lens element 120 with negative refractive power having a concave object-side surface 121 and a convex image-side surface 122, the object-side and image-side surfaces 121 and 122 thereof being aspheric; a plastic fourth lens element 130 with positive refractive power having a concave object-side surface 131 and a convex image-side surface 132, the concave object-side surface 131 and the convex image-side surface 132 thereof being aspheric; a plastic fifth lens element 140 with negative refractive power having a concave object-side surface 141 and a concave image-side surface 142 on which at least one inflection point is formed, the concave object-side surface 141 and the concave image-side surface 142 thereof being aspheric; wherein an aperture stop 150 is disposed between the first and second lens elements 100 and 110; wherein an IR filter 160 is disposed between the image-side surface 142 of the fifth lens element 140 and an image plane 170; and wherein the IR filter 160 is made of glass and has no influence on the focal length of the imaging lens assembly.

The equation of the aspheric surface profiles is expressed as follows:

$$X(Y) = (Y^2/R)/(1 + \mathrm{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: $f=4.34$ (mm).

In the first embodiment of the present imaging lens assembly, the f-number of the imaging lens assembly is Fno, and it satisfies the relation: $Fno=2.85$.

In the first embodiment of the present imaging lens assembly, half of the maximal field of view of the imaging lens assembly is HFOV, and it satisfies the relation: $HFOV=33.2$ deg.

In the first embodiment of the present imaging lens assembly, the Abbe number of the first lens element 100 is V1, the Abbe number of the second lens element 110 is V2, and they satisfy the relation: $V1-V2=32.5$.

In the first embodiment of the present imaging lens assembly, the Abbe number of the first lens element 100 is V1, the Abbe number of the second lens element 110 is V2, the Abbe number of the third lens element 120 is V3, and they satisfy the relation: $V1-((V1-V2+V3)/3)=21.7$.

In the first embodiment of the present imaging lens assembly, the focal length of the first lens element 100 is f1, the focal length of the imaging lens assembly is f, and they satisfy the relation: f1/f=0.59.

In the first embodiment of the present imaging lens assembly, the focal length of the first lens element 100 is f1, the focal length of the fourth lens element 130 is f4, and they satisfy the relation: f1/f4=1.26.

In the first embodiment of the present imaging lens assembly, the radius of curvature of the object-side surface 101 of the first lens element 100 is R1, the focal length of the imaging lens assembly is f, and they satisfy the relation: R1/f=0.33.

In the first embodiment of the present imaging lens assembly, the thickness on the optical axis of the second lens element 110 is CT2, the focal length of the imaging lens assembly is f, and they satisfy the relation: (CT2/f)*10=0.81.

In the first embodiment of the present imaging lens assembly, the distance on the optical axis between the first lens element 100 and the second lens element 110 is T12, the focal length of the imaging lens assembly is f, and they satisfy the relation: (T12/f)*10=0.20.

In the first embodiment of the present imaging lens assembly, the distance on the optical axis between the object-side surface 101 of the first lens element 100 and the image-side surface 142 of the fifth lens element 140 is Td, the focal length of the imaging lens assembly is f, and they satisfy the relation: Td/f=0.81.

In the first embodiment of the present imaging lens assembly, an electronic sensor is disposed at the image plane 170 for image formation. The distance on the optical axis between the aperture stop 150 and the electronic sensor is SL, the distance on the optical axis between the object-side surface 101 of the first lens element 100 and the electronic sensor is TTL, and they satisfy the relation: SL/TTL=0.88.

In the first embodiment of the present imaging lens assembly, the distance on the optical axis between the object-side surface 101 of the first lens element 100 and the electronic sensor is TTL, half of the diagonal length of the effective pixel area of the electronic sensor is ImgH, and they satisfy the relation: TTL/ImgH=1.67.

The detailed optical data of the first embodiment is shown in FIG. 7 (TABLE 1), and the aspheric surface data is shown in FIGS. 8A and 8B (TABLES 2A and 2B), wherein the units of the radius of curvature, the thickness and the focal length are expressed in mm, and HFOV is half of the maximal field of view.

Figure 2A:
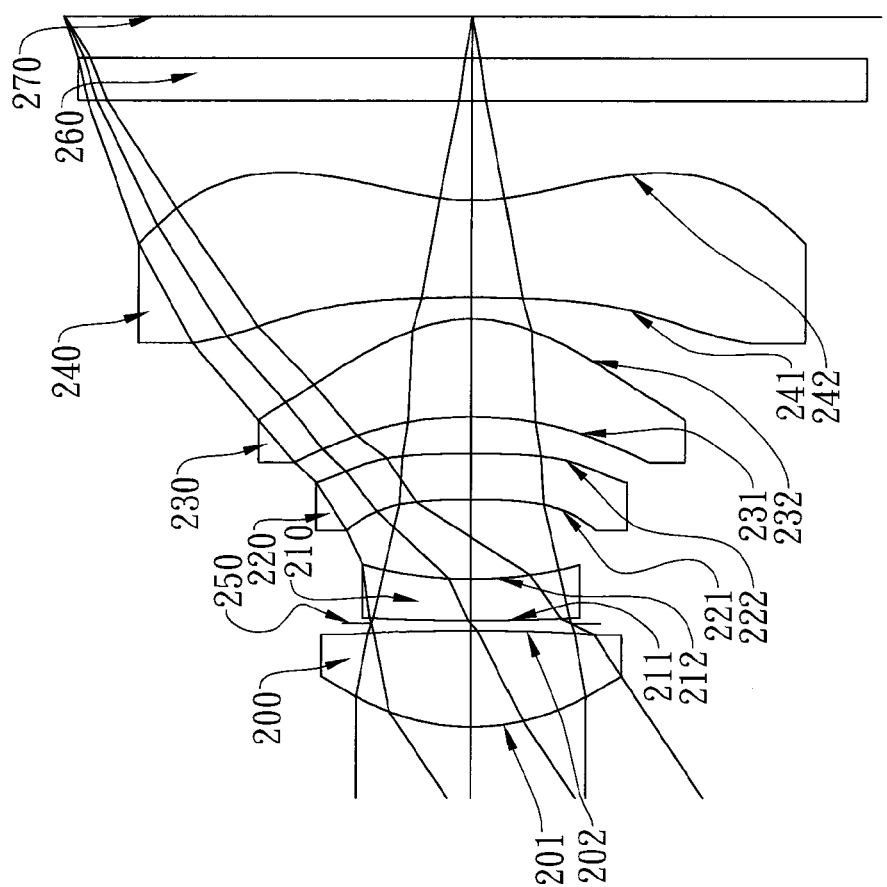
FIG. 2A shows an imaging lens assembly in accordance with a second embodiment of the present invention.
Figure 2B:
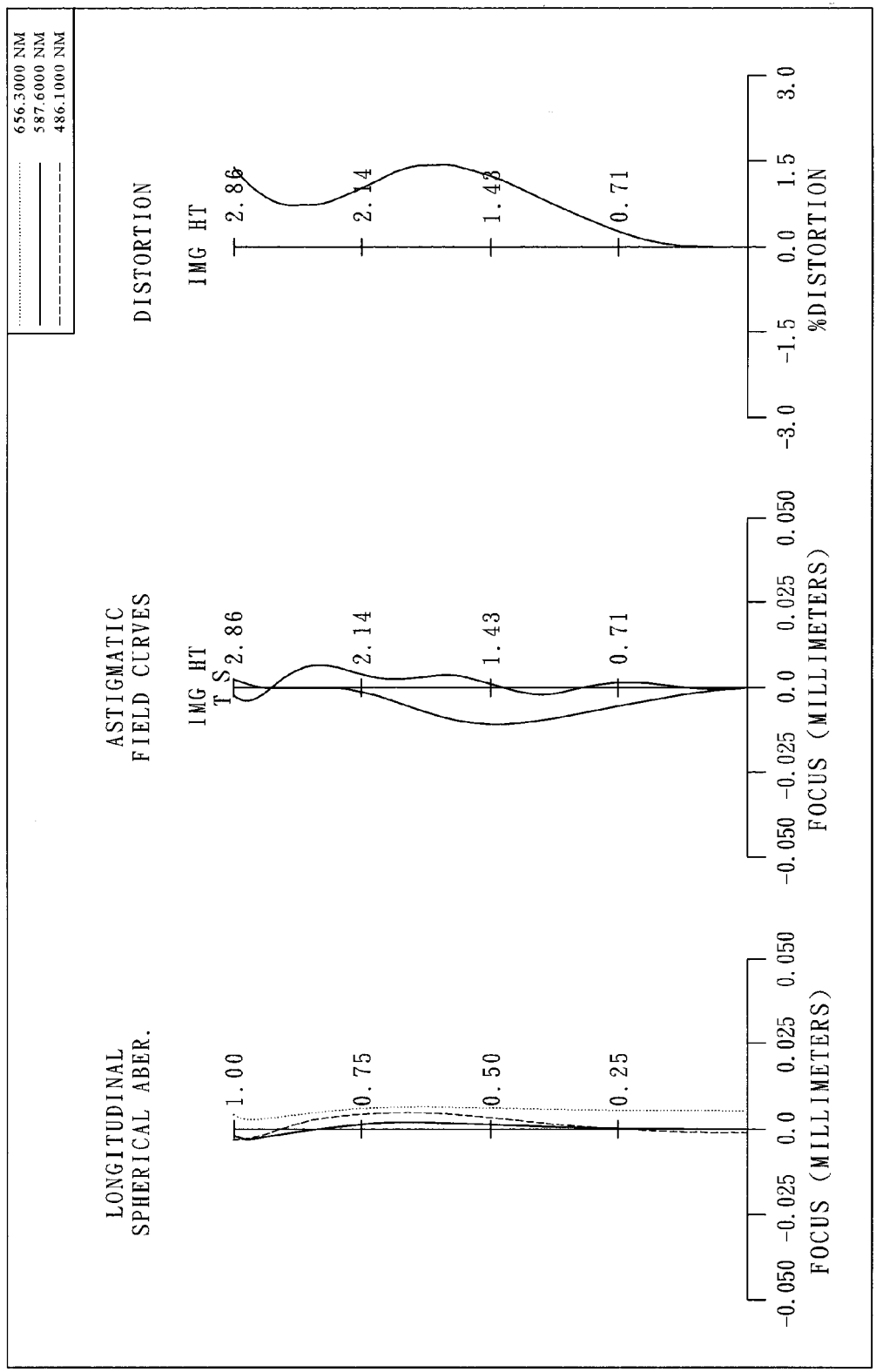
FIG. 2B shows the aberration curves of the second embodiment of the present invention.

FIG. 2A shows an imaging lens assembly in accordance with a second embodiment of the present invention, and FIG. 2B shows the aberration curves of the second embodiment of the present invention. The imaging lens assembly of the second embodiment of the present invention mainly comprises five lens elements, in order from the object side to the image side: a plastic first lens element 200 with positive refractive power having a convex object-side surface 201 and a convex image-side surface 202, the object-side and image-side surfaces 201 and 202 thereof being aspheric; a plastic second lens element 210 with negative refractive power having a convex object-side surface 211 and a concave image-side surface 212, the object-side and image-side surfaces 211 and 212 thereof being aspheric; a plastic third lens element 220 with negative refractive power having a concave object-side surface 221 and a convex image-side surface 222, the object-side and image-side surfaces 221 and 222 thereof being aspheric; a plastic fourth lens element 230 with positive refractive power having a concave object-side surface 231 and a convex image-side surface 232, the object-side and image-side surfaces 231 and 232 thereof being aspheric; and a plastic fifth lens element 240 with negative refractive power having a concave object-side surface 241 and a concave image-side surface 242 on which at least one inflection point is formed, the object-side and image-side surfaces 241 and 242 thereof being aspheric; wherein an aperture stop 250 is disposed between the first and second lens elements 200 and 210; wherein an IR filter 260 is disposed between the image-side surface 242 of the fifth lens element 240 and an image plane 270; and wherein the IR filter 260 is made of glass and has no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=4.19 (mm).

In the second embodiment of the present imaging lens assembly, the f-number of the imaging lens assembly is Fno, and it satisfies the relation: Fno=2.60.

In the second embodiment of the present imaging lens assembly, half of the maximal field of view of the imaging lens assembly is HFOV, and it satisfies the relation: HFOV=34.0 deg.

In the second embodiment of the present imaging lens assembly, the Abbe number of the first lens element 200 is V1, the Abbe number of the second lens element 210 is V2, and they satisfy the relation: V1−V2=34.5.

In the second embodiment of the present imaging lens assembly, the Abbe number of the first lens element 200 is V1, the Abbe number of the second lens element 210 is V2, the Abbe number of the third lens element, and they satisfy the relation: V1−((V1−V2+V3)/3)=23.0.

In the second embodiment of the present imaging lens assembly, the focal length of the first lens element 200 is f1, the focal length of the imaging lens assembly is f, and they satisfy the relation: f1/f=0.65.

In the second embodiment of the present imaging lens assembly, the focal length of the first lens element 200 is f1, the focal length of the fourth lens element 230 is f4, and they satisfy the relation: f1/f4=1.07.

In the second embodiment of the present imaging lens assembly, the radius of curvature of the object-side surface 201 of the first lens element 200 is R1, the focal length of the imaging lens assembly is f, and they satisfy the relation: R1/f=0.38.

In the second embodiment of the present imaging lens assembly, the thickness on the optical axis of the second lens element 210 is CT2, the focal length of the imaging lens assembly is f, and they satisfy the relation: (CT2/f)*10=0.70.

In the second embodiment of the present imaging lens assembly, the distance on the optical axis between the first lens element 200 and the second lens element 210 is T12, the focal length of the imaging lens assembly is f, and they satisfy the relation: (T12/f)*10=0.17.

In the second embodiment of the present imaging lens assembly, the distance on the optical axis between the object-side surface 201 of the first lens element 200 and the image-side surface 242 of the fifth lens element 240 is Td, the focal length of the imaging lens assembly is f, and they satisfy the relation: Td/f=0.88.

In the second embodiment of the present imaging lens assembly, an electronic sensor is disposed at the image plane 270 for image formation. The distance on the optical axis between the aperture stop 250 and the electronic sensor is SL, the distance on the optical axis between the object-side surface 201 of the first lens element 200 and the electronic sensor is TTL, and they satisfy the relation: SL/TTL=0.85.

In the second embodiment of the present imaging lens assembly, the distance on the optical axis between the object-side surface 201 of the first lens element 200 and the electronic sensor is TTL, half of the diagonal length of the effective pixel area of the electronic sensor is ImgH, and they satisfy the relation: TTL/ImgH=1.71.

The detailed optical data of the second embodiment is shown in FIG. 9 (TABLE 3), and the aspheric surface data is shown in FIGS. 10A and 10B (TABLES 4A and 4B), wherein the units of the radius of curvature, the thickness and the focal length are expressed in mm, and HFOV is half of the maximal field of view.

Figure 3A:
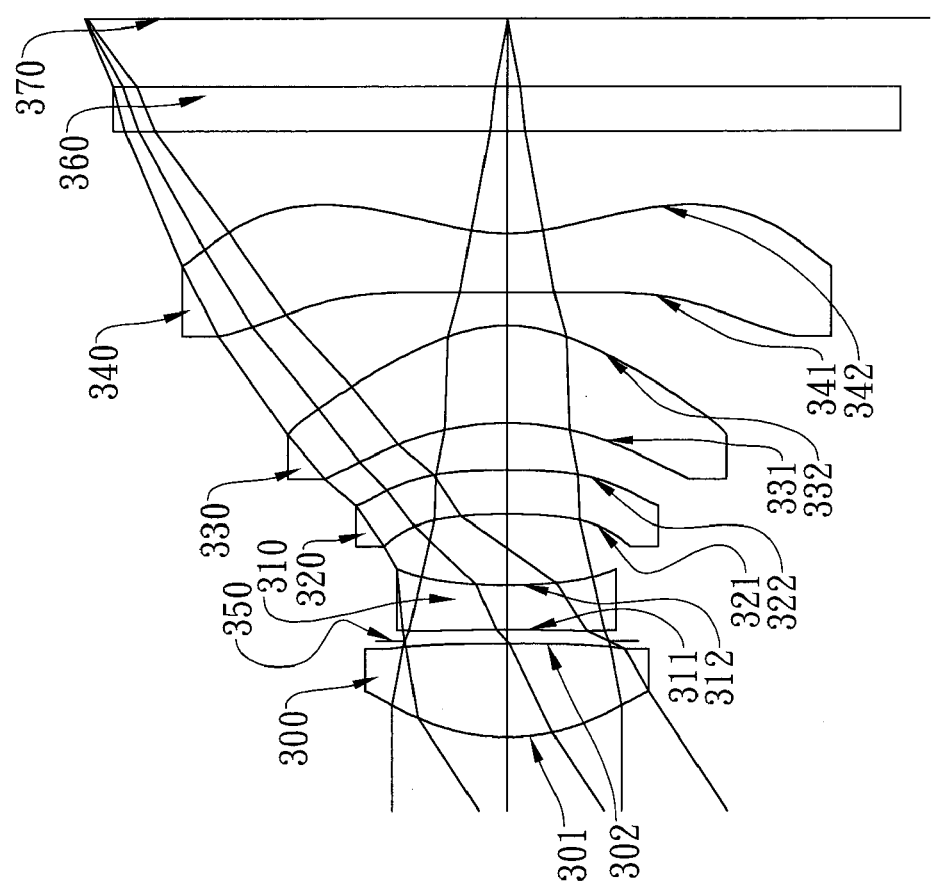
FIG. 3A shows an imaging lens assembly in accordance with a third embodiment of the present invention.
Figure 3B:
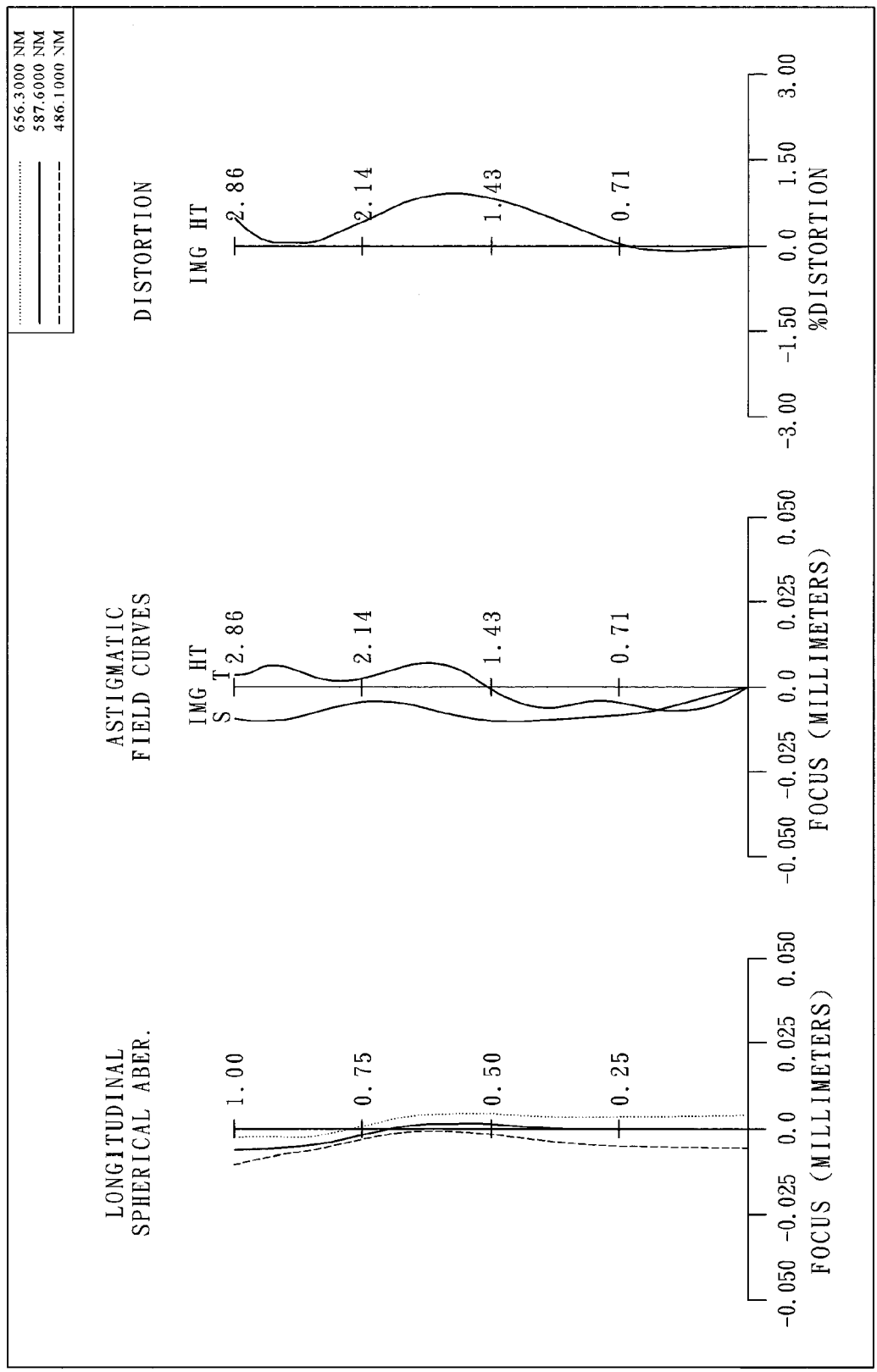
FIG. 3B shows the aberration curves of the third embodiment of the present invention.

FIG. 3A shows an imaging lens assembly in accordance with a third embodiment of the present invention, and FIG. 3B shows the aberration curves of the third embodiment of the present invention. The imaging lens assembly of the third embodiment of the present invention mainly comprises five lens elements, in order from the object side to the image side: a plastic first lens element 300 with positive refractive power having a convex object-side surface 301 and a convex image-side surface 302, the object-side and image-side surfaces 301 and 302 thereof being aspheric; a plastic second lens element 310 with negative refractive power having a concave object-side surface 311 and a concave image-side surface 312, the object-side and image-side surfaces 311 and 312 thereof being aspheric; a plastic third lens element 320 with negative refractive power having a concave object-side surface 321 and a convex image-side surface 322, the object-side and image-side surfaces 321 and 322 thereof being aspheric; a plastic fourth lens element 330 with positive refractive power having a concave object-side surface 331 and a convex image-side surface 332, the object-side and image-side surfaces 331 and 332 thereof being aspheric; and a plastic fifth lens element 340 with negative refractive power having a convex object-side surface 341 and a concave image-side surface 342 on which at least one inflection point is formed, the object-side and image-side surfaces 341 and 342 thereof being aspheric; wherein an aperture stop 350 is disposed between the first and second lens elements 300 and 310; wherein an IR filter 360 is disposed between the image-side surface 342 of the fifth lens element 340 and an image plane 370; and wherein the IR filter 360 is made of glass and has no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=4.35 (mm). In the third embodiment of the present imaging lens assembly, the f-number of the imaging lens assembly is Fno, and it satisfies the relation: Fno=2.80.

In the third embodiment of the present imaging lens assembly, half of the maximal field of view of the imaging lens assembly is HFOV, and it satisfies the relation: HFOV=33.2 deg.

In the third embodiment of the present imaging lens assembly, the Abbe number of the first lens element 300 is V1, the Abbe number of the second lens element 310 is V2, and they satisfy the relation: V1−V2=32.5.

In the third embodiment of the present imaging lens assembly, the Abbe number of the first lens element 300 is V1, the Abbe number of the second lens element 310 is V2, the Abbe number of the third lens element 320 is V3, and they satisfy the relation: V1−((V1−V2+V3)/3=21.7.

In the third embodiment of the present imaging lens assembly, the focal length of the first lens element 300 is f1, the focal length of the imaging lens assembly is f, and they satisfy the relation: f1/f=0.56.

In the third embodiment of the present imaging lens assembly, the focal length of the first lens element 300 is f1, the focal length of the fourth lens element 330 is f4, and they satisfy the relation: f1/f4=0.90.

In the third embodiment of the present imaging lens assembly, the radius of curvature of the object-side surface 301 of the first lens element 300 is R1, the focal length of the imaging lens assembly is f, and they satisfy the relation: R1/f=0.33.

In the third embodiment of the present imaging lens assembly, the thickness on the optical axis of the second lens element 310 is CT2, the focal length of the imaging lens assembly is f, and they satisfy the relation: (CT2/f)*10=0.69.

In the third embodiment of the present imaging lens assembly, the distance on the optical axis between the first lens element 300 and the second lens element 310 is T12, the focal length of the imaging lens assembly is f, and they satisfy the relation: (T12/f)*10=0.22.

In the third embodiment of the present imaging lens assembly, the distance on the optical axis between the object-side surface 301 of the first lens element 300 and the image-side surface 342 of the fifth lens element 340 is Td, the focal length of the imaging lens assembly is f, and they satisfy the relation: Td/f=0.79.

In the third embodiment of the present imaging lens assembly, an electronic sensor is disposed at the image plane 370 for image formation. The distance on the optical axis between the aperture stop 350 and the electronic sensor is SL, the distance on the optical axis between the object-side surface 301 of the first lens element 300 and the electronic sensor is TTL, and they satisfy the relation: SL/TTL=0.86.

In the third embodiment of the present imaging lens assembly, the distance on the optical axis between the object-side surface 301 of the first lens element 300 and the electronic sensor is TTL, half of the diagonal length of the effective pixel area of the electronic sensor is ImgH, and they satisfy the relation: TTL/ImgH=1.67.

The detailed optical data of the third embodiment is shown in FIG. 11 (TABLE 5), and the aspheric surface data is shown in FIGS. 12A and 12B (TABLES 6A and 6B), wherein the units of the radius of curvature, the thickness and the focal length are expressed in mm, and HFOV is half of the maximal field of view.

Figure 4A:
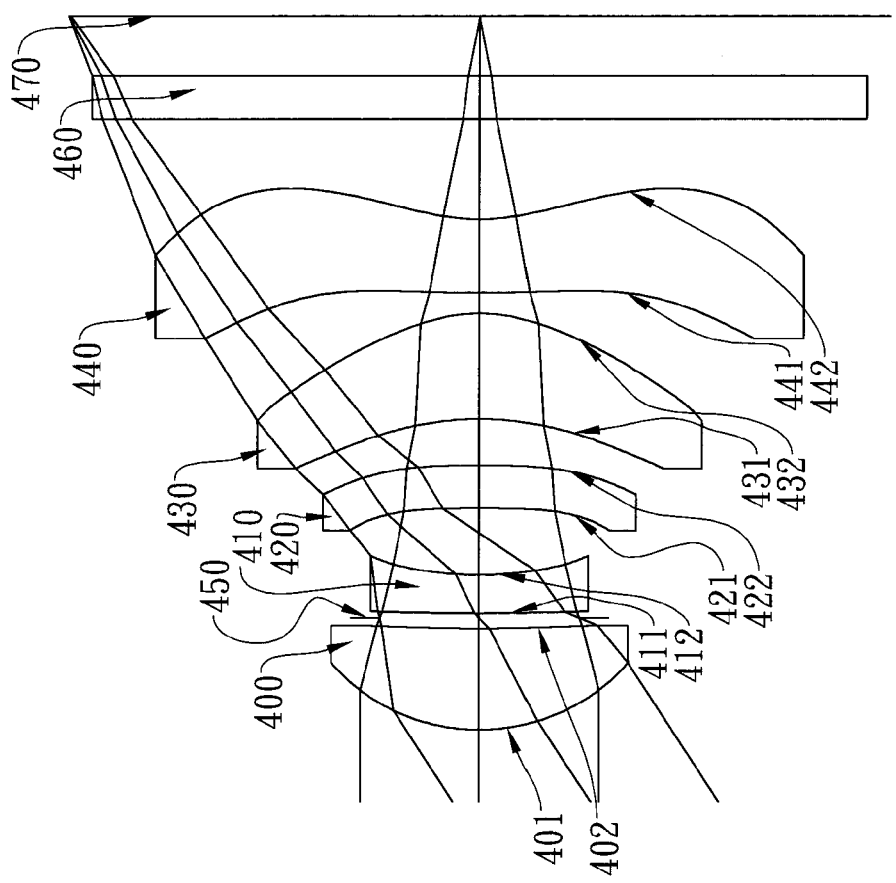
FIG. 4A shows an imaging lens assembly in accordance with a fourth embodiment of the present invention.
Figure 4B:
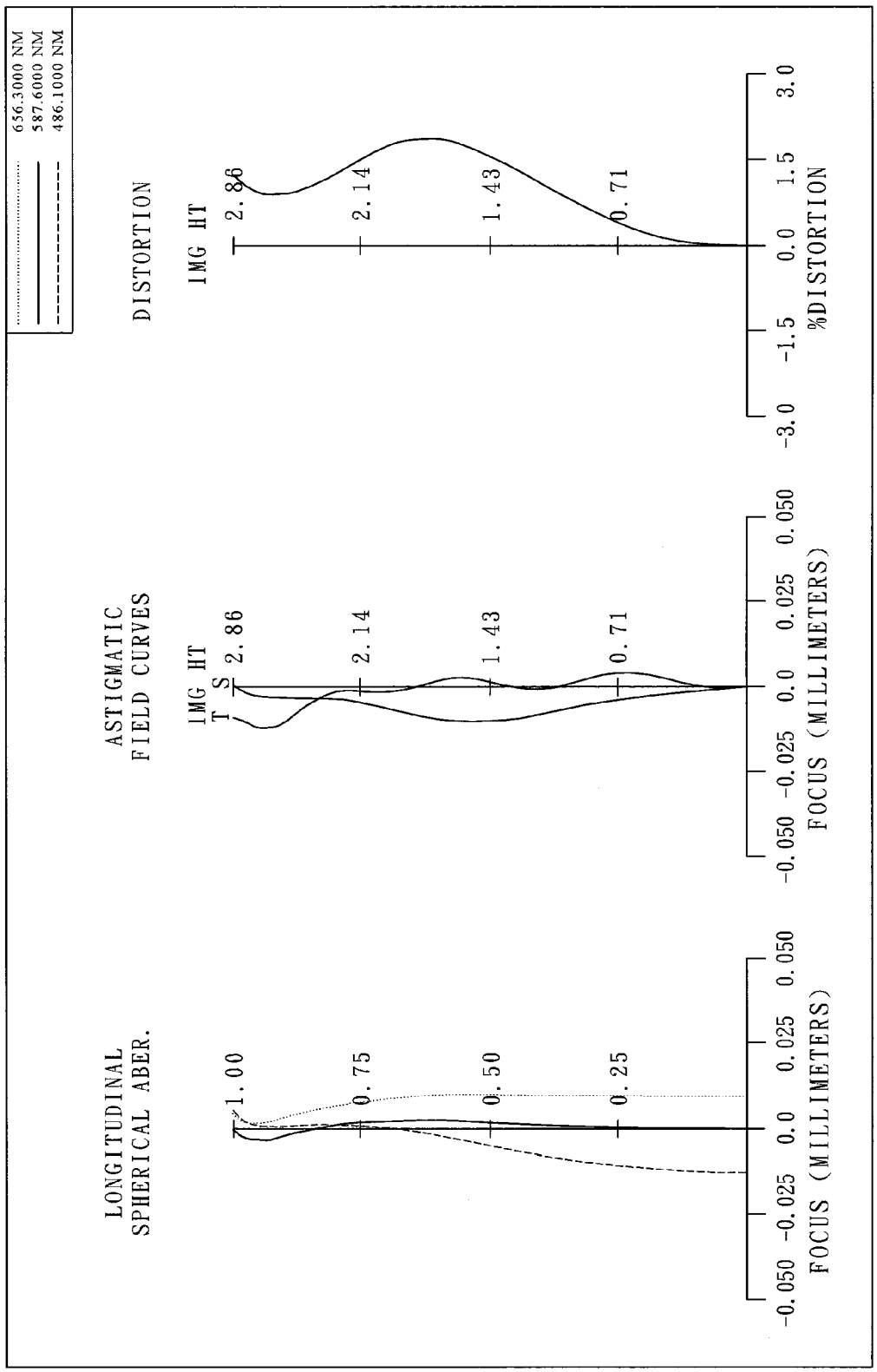
FIG. 4B shows the aberration curves of the fourth embodiment of the present invention.

FIG. 4A shows an imaging lens assembly in accordance with a fourth embodiment of the present invention, and FIG. 4B shows the aberration curves of the fourth embodiment of the present invention. The imaging lens assembly of the fourth embodiment of the present invention mainly comprises five lens elements, in order from the object side to the image side: a plastic first lens element 400 with positive refractive power having a convex object-side surface 401 and a concave image-side surface 402, the object-side and image-side surfaces 401 and 402 thereof being aspheric; a plastic second lens element 410 with negative refractive power having a convex object-side surface 411 and a concave image-side surface 412, the object-side and image-side surfaces 411 and 412 thereof being aspheric; a plastic third lens element 420 with positive refractive power having a concave object-side surface 421 and a convex image-side surface 422, the object-side and image-side surfaces 421 and 422 thereof being aspheric; a plastic fourth lens element 430 with positive refractive power having a concave object-side surface 431 and a convex image-side surface 432, the object-side and image-side surfaces 431 and 432 thereof being aspheric; and a plastic fifth lens element 440 with negative refractive power having a convex object-side surface 441 and a concave image-side surface 442 on which at least one inflection point is formed, the object-side and image-side surfaces 441 and 442 thereof being aspheric; wherein an aperture stop 450 is disposed between the first and second lens elements 400 and 410; wherein an IR filter 460 is disposed between the image-side surface 442 of the fifth lens element 440 and an image plane 470; and wherein the IR filter 460 is made of glass and has no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=4.33 (mm).

In the fourth embodiment of the present imaging lens assembly, the f-number of the imaging lens assembly is Fno, and it satisfies the relation: Fno=2.60.

In the fourth embodiment of the present imaging lens assembly, half of the maximal field of view of the imaging lens assembly is HFOV, and it satisfies the relation: HFOV=33.2 deg.

In the fourth embodiment of the present imaging lens assembly, the Abbe number of the first lens element 400 is V1, the Abbe number of the second lens element 410 is V2, and they satisfy the relation: V1−V2=34.5.

In the fourth embodiment of the present imaging lens assembly, the Abbe number of the first lens element 400 is V1, the Abbe number of the second lens element 410 is V2, the Abbe number of the third lens element 420 is V3, and they satisfy the relation: V1−((V1−V2+V3)/3=23.0.

In the fourth embodiment of the present imaging lens assembly, the focal length of the first lens element 400 is f1, the focal length of the imaging lens assembly is f, and they satisfy the relation: f1/f=0.67.

In the fourth embodiment of the present imaging lens assembly, the focal length of the first lens element 400 is f1, the focal length of the fourth lens element 430 is f4, and they satisfy the relation: f1/f4=0.89.

In the fourth embodiment of the present imaging lens assembly, the radius of curvature of the object-side surface 401 of the first lens element 400 is R1, the focal length of the imaging lens assembly is f, and they satisfy the relation: R1/f=0.32.

In the fourth embodiment of the present imaging lens assembly, the thickness on the optical axis of the second lens element 410 is CT2, the focal length of the imaging lens assembly is f, and they satisfy the relation: (CT2/f)*10=0.62.

In the fourth embodiment of the present imaging lens assembly, the distance on the optical axis between the first lens element 400 and the second lens element 410 is T12, the focal length of the imaging lens assembly is f, and they satisfy the relation: (T12/f)*10=0.24.

In the fourth embodiment of the present imaging lens assembly, the distance on the optical axis between the object-side surface 401 of the first lens element 400 and the image-side surface 442 of the fifth lens element 440 is Td, the focal length of the imaging lens assembly is f, and they satisfy the relation: Td/f=0.82.

In the fourth embodiment of the present imaging lens assembly, an electronic sensor is disposed at the image plane 470 for image formation. The distance on the optical axis between the aperture stop 450 and the electronic sensor is SL, the distance on the optical axis between the object-side surface 401 of the first lens element 400 and the electronic sensor is TTL, and they satisfy the relation: SL/TTL=0.84.

In the fourth embodiment of the present imaging lens assembly, the distance on the optical axis between the object-side surface 401 of the first lens element 400 and the electronic sensor is TTL, half of the diagonal length of the effective pixel area of the electronic sensor is ImgH, and they satisfy the relation: TTL/ImgH=1.71.

The detailed optical data of the fourth embodiment is shown in FIG. 13 (TABLE 7), and the aspheric surface data is shown in FIGS. 14A and 14B (TABLES 8A and 8B), wherein the units of the radius of curvature, the thickness and the focal length are expressed in mm, and HFOV is half of the maximal field of view.

Figure 5A:
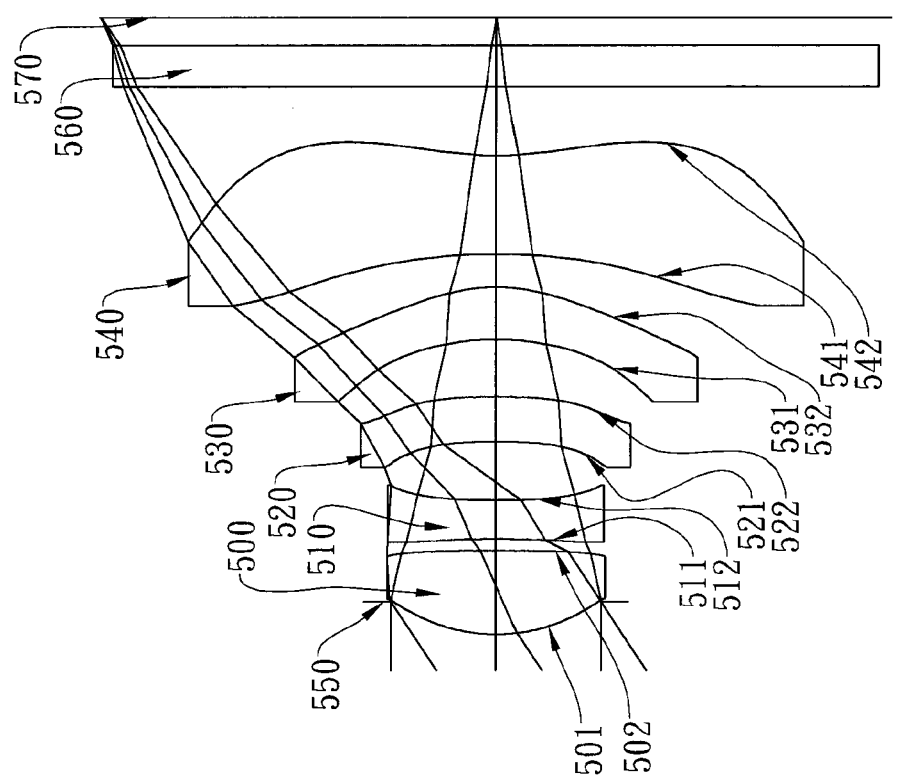
FIG. 5A shows an imaging lens assembly in accordance with a fifth embodiment of the present invention.
Figure 5B:
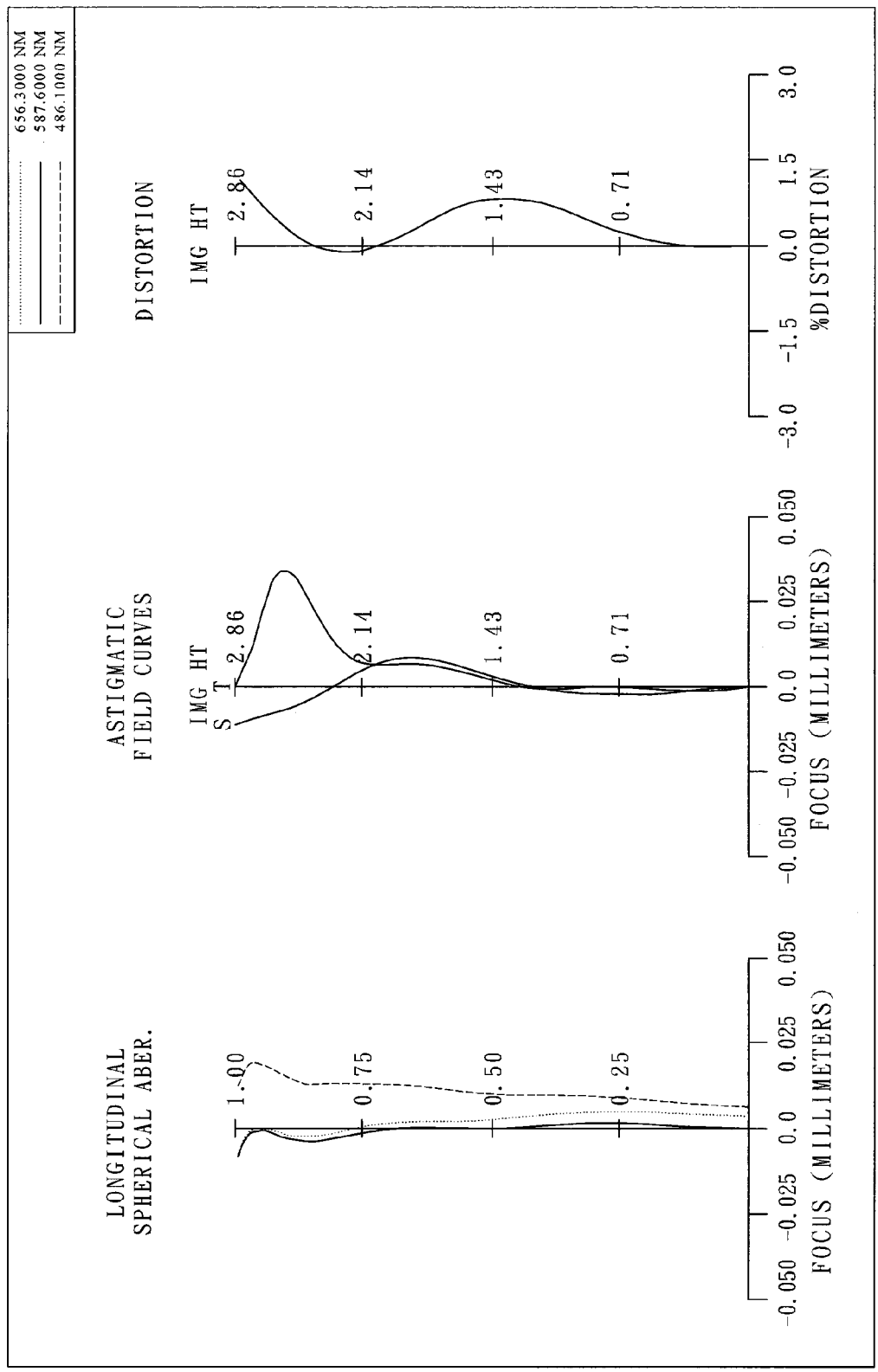
FIG. 5B shows the aberration curves of the fifth embodiment of the present invention.

FIG. 5A shows an imaging lens assembly in accordance with a fifth embodiment of the present invention, and FIG. 5B shows the aberration curves of the fifth embodiment of the present invention. The imaging lens assembly of the fifth embodiment of the present invention mainly comprises five lens elements, in order from the object side to the image side: a plastic first lens element 500 with positive refractive power having a convex object-side surface 501 and a convex image-side surface 502, the object-side and image-side surfaces 501 and 502 thereof being aspheric; a plastic second lens element 510 with negative refractive power having a concave object-side surface 511 and a concave image-side surface 512, the object-side and image-side surfaces 511 and 512 thereof being aspheric; a plastic third lens element 520 with negative refractive power having a concave object-side surface 521 and a convex image-side surface 522, the object-side and image-side surfaces 521 and 522 thereof being aspheric; a plastic fourth lens element 530 with positive refractive power having a concave object-side surface 531 and a convex image-side surface 532, the object-side and image-side surfaces 531 and 532 thereof being aspheric; and a plastic fifth lens element 540 with negative refractive power having a concave object-side surface 541 and a concave image-side surface 542 on which at least one inflection point is formed, the object-side and image-side surfaces 541 and 542 thereof being aspheric; wherein an aperture stop 550 is disposed between the imaged object and the first lens elements 500; wherein an IR filter 560 is disposed between the image-side surface 542 of the fifth lens element 540 and an image plane 570; and wherein the IR filter 560 is made of glass and has no influence on the focal length of the imaging lens assembly.

The equation of the aspheric surface profiles of the fifth embodiment has the same form as that of the first embodiment.

In the fifth embodiment of the present imaging lens assembly, the focal length of the imaging lens assembly is f, and it satisfies the relation: f=4.30 (mm).

In the fifth embodiment of the present imaging lens assembly, the f-number of the imaging lens assembly is Fno, and it satisfies the relation: Fno=2.80.

In the fifth embodiment of the present imaging lens assembly, half of the maximal field of view of the imaging lens assembly is HFOV, and it satisfies the relation: HFOV=33.5 deg.

In the fifth embodiment of the present imaging lens assembly, the Abbe number of the first lens element 500 is V1, the Abbe number of the second lens element 510 is V2, and they satisfy the relation: V1−V2=34.5.

In the fifth embodiment of the present imaging lens assembly, the Abbe number of the first lens element 500 is V1, the Abbe number of the second lens element 510 is V2, the Abbe number of the third lens element 520 is V3, and they satisfy the relation: V1−((V1−V2+V3)/3=23.0.

In the fifth embodiment of the present imaging lens assembly, the focal length of the first lens element 500 is f1, the focal length of the imaging lens assembly is f, and they satisfy the relation: f1/f=0.51.

In the fifth embodiment of the present imaging lens assembly, the focal length of the first lens element 500 is f1, the focal length of the fourth lens element 530 is f4, and they satisfy the relation: f1/f4=0.43.

In the fifth embodiment of the present imaging lens assembly, the radius of curvature of the object-side surface 501 of the first lens element 500 is R1, the focal length of the imaging lens assembly is f, and they satisfy the relation: R1/f=0.29.

In the fifth embodiment of the present imaging lens assembly, the thickness on the optical axis of the second lens element 510 is CT2, the focal length of the imaging lens assembly is f, and they satisfy the relation: (CT2/f)*10=0.65.

In the fifth embodiment of the present imaging lens assembly, the distance on the optical axis between the first lens element 500 and the second lens element 510 is T12, the focal length of the imaging lens assembly is f, and they satisfy the relation: (T12/f)*10=0.20.

In the fifth embodiment of the present imaging lens assembly, the distance on the optical axis between the object-side surface 501 of the first lens element 500 and the image-side surface 542 of the fifth lens element 540 is Td, the focal length of the imaging lens assembly is f, and they satisfy the relation: Td/f=0.81.

In the fifth embodiment of the present imaging lens assembly, an electronic sensor is disposed at the image plane 570 for image formation. The distance on the optical axis between the aperture stop 550 and the electronic sensor is SL, the distance on the optical axis between the object-side surface 501 of the first lens element 500 and the electronic sensor is TTL, and they satisfy the relation: SL/TTL=0.95.

In the fifth embodiment of the present imaging lens assembly, the distance on the optical axis between the object-side surface 501 of the first lens element 500 and the electronic sensor is TTL, half of the diagonal length of the effective pixel area of the electronic sensor is ImgH, and they satisfy the relation: TTL/ImgH=1.53.

The detailed optical data of the fifth embodiment is shown in FIG. 15 (TABLE 9), and the aspheric surface data is shown in FIGS. 16A and 16B (TABLES 10A and 10B), wherein the units of the radius of curvature, the thickness and the focal length are expressed in mm, and HFOV is half of the maximal field of view.

Figure 6A:
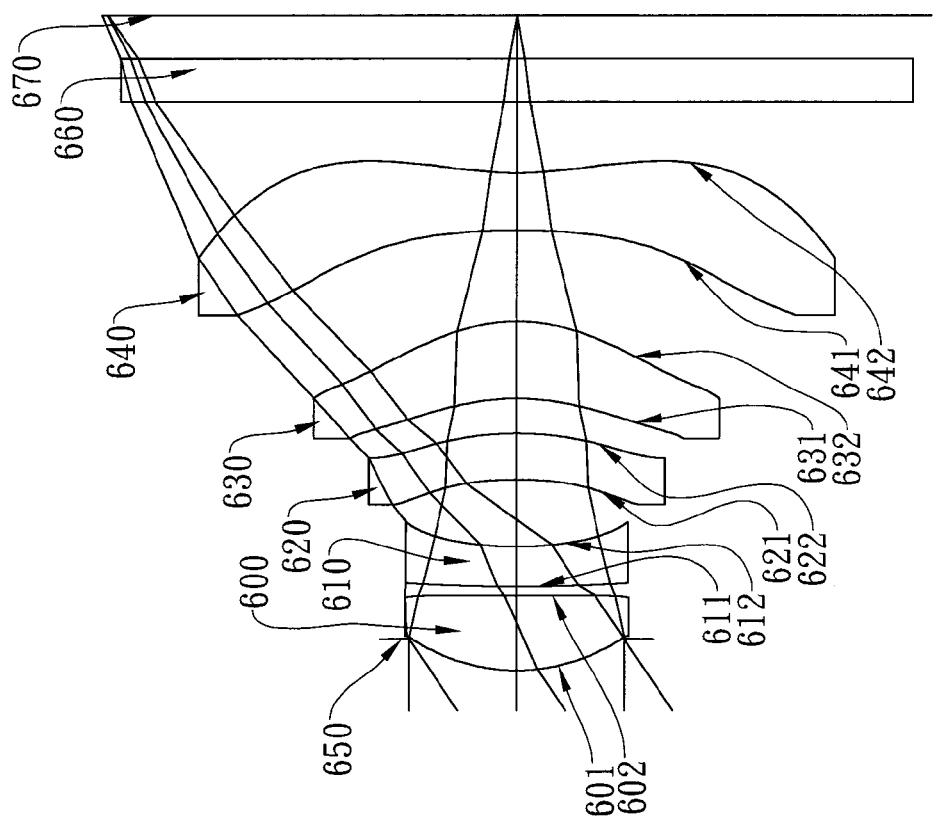
FIG. 6A shows an imaging lens assembly in accordance with a sixth embodiment of the present invention.
Figure 6B:
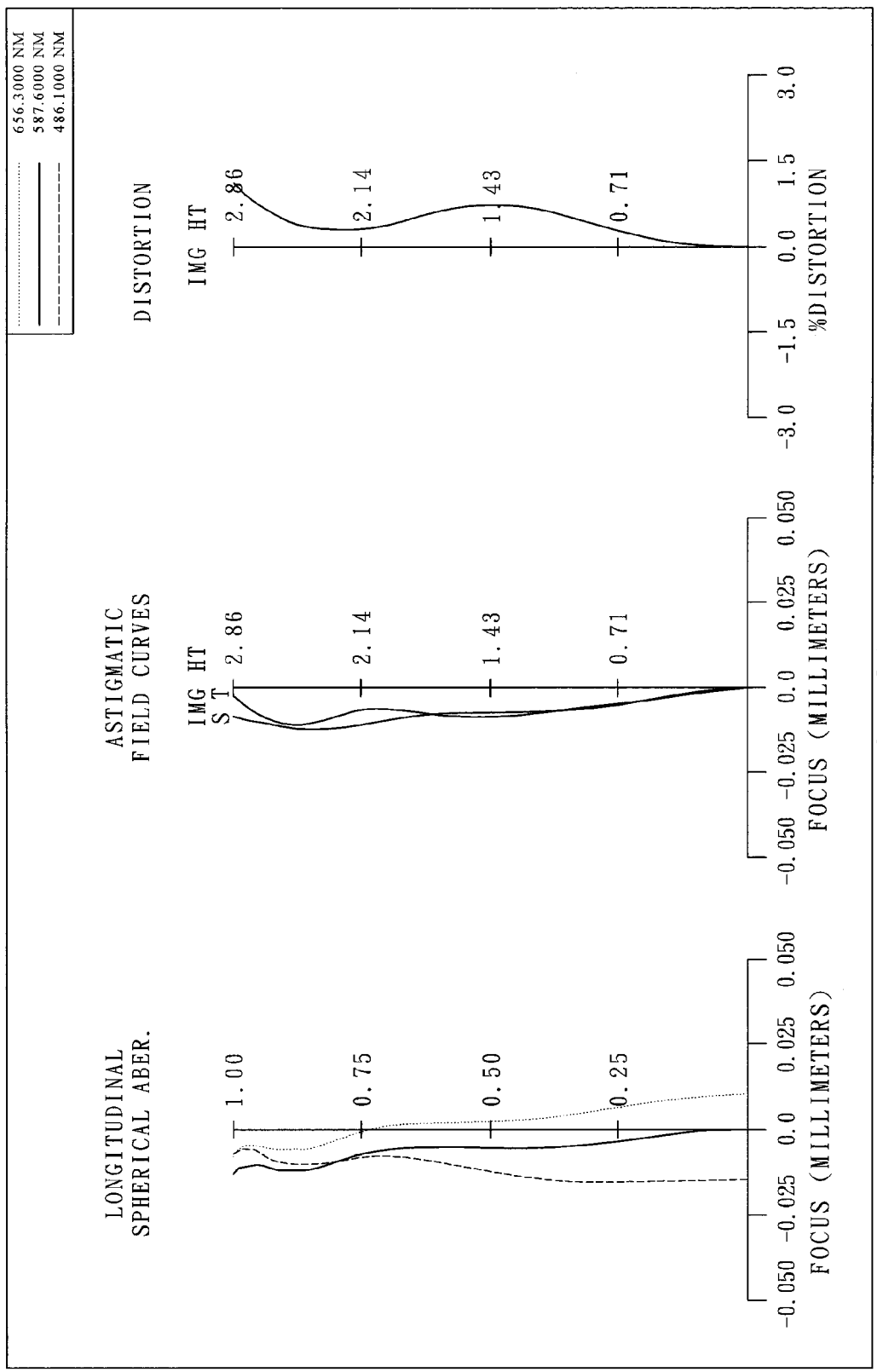
FIG. 6B shows the aberration curves of the sixth embodiment of the present invention.

FIG. 6A shows an imaging lens assembly in accordance with a sixth embodiment of the present invention, and FIG. 6B shows the aberration curves of the sixth embodiment of the present invention. The imaging lens assembly of the sixth embodiment of the present invention mainly comprises five lens elements, in order from the object side to the image side: a plastic first lens element 600 with positive refractive power having a convex object-side surface 601 and a concave image-side surface 602, the object-side and image-side surfaces 601 and 602 thereof being aspheric; a plastic second lens element 610 with negative refractive power having a convex object-side surface 611 and a concave image-side surface 612, the object-side and image-side surfaces 611 and 612 thereof being aspheric; a plastic third lens element 620 with positive refractive power having a concave object-side surface 621 and a convex image-side surface 622, the object-side and image-side surfaces 621 and 622 thereof being aspheric; a plastic fourth lens element 630 with positive refractive power having a concave object-side surface 631 and a convex image-side surface 632, the object-side and image-side surfaces 631 and 632 thereof being aspheric; and a plastic fifth lens element 640 with negative refractive power having a concave object-side surface 641 and a concave image-side surface 642 on which at least one inflection point is formed, the object-side and image-side surfaces 641 and 642 thereof being aspheric; wherein an aperture stop 650 is disposed between the imaged object and the first lens elements 600; wherein an IR filter 660 is disposed between the image-side surface 642 of the fifth lens element 640 and an image plane 670; and wherein the IR filter 660 is made of glass and has no influence on the focal length of the imaging lens assembly.

The equation of the aspheric surface profiles of the sixth embodiment has the same form as that of the first embodiment.

In the sixth embodiment of the present imaging lens assembly, the focal length of the imaging lens assembly is f, and it satisfies the relation: f=4.20 (mm).

In the sixth embodiment of the present imaging lens assembly, the f-number of the imaging lens assembly is Fno, and it satisfies the relation: Fno=2.80.

In the sixth embodiment of the present imaging lens assembly, half of the maximal field of view of the imaging lens assembly is HFOV, and it satisfies the relation: HFOV=34.0 deg.

In the sixth embodiment of the present imaging lens assembly, the Abbe number of the first lens element 600 is V1, the Abbe number of the second lens element 610 is V2, and they satisfy the relation: V1−V2=34.5.

In the sixth embodiment of the present imaging lens assembly, the Abbe number of the first lens element 600 is V1, the Abbe number of the second lens element 610 is V2, the Abbe number of the third lens element 620 is V3, and they satisfy the relation: V1−((V1−V2+V3)/3=11.5.

In the sixth embodiment of the present imaging lens assembly, the focal length of the first lens element 600 is f1, the focal length of the imaging lens assembly is f, and they satisfy the relation: f1/f=0.62.

In the sixth embodiment of the present imaging lens assembly, the focal length of the first lens element 600 is f1, the focal length of the fourth lens element 630 is f4, and they satisfy the relation: f1/f4=0.51.

In the sixth embodiment of the present imaging lens assembly, the radius of curvature of the object-side surface 601 of the first lens element 600 is R1, the focal length of the imaging lens assembly is f, and they satisfy the relation: R1/f=0.31.

In the sixth embodiment of the present imaging lens assembly, the thickness on the optical axis of the second lens element 610 is CT2, the focal length of the imaging lens assembly is f, and they satisfy the relation: (CT2/f)*10=0.67.

In the sixth embodiment of the present imaging lens assembly, the distance on the optical axis between the first lens element 600 and the second lens element 610 is T12, the focal length of the imaging lens assembly is f, and they satisfy the relation: (T12/f)*10=0.15.

In the sixth embodiment of the present imaging lens assembly, the distance on the optical axis between the object-side surface 601 of the first lens element 600 and the image-side surface 642 of the fifth lens element 640 is Td, the focal length of the imaging lens assembly is f, and they satisfy the relation: Td/f=0.83.

In the sixth embodiment of the present imaging lens assembly, an electronic sensor is disposed at the image plane 670 for image formation. The distance on the optical axis between the aperture stop 650 and the electronic sensor is SL, the distance on the optical axis between the object-side surface 601 of the first lens element 600 and the electronic sensor is TTL, and they satisfy the relation: SL/TTL=0.95.

In the sixth embodiment of the present imaging lens assembly, the distance on the optical axis between the object-side surface 601 of the first lens element 600 and the electronic sensor is TTL, half of the diagonal length of the effective pixel area of the electronic sensor is ImgH, and they satisfy the relation: TTL/ImgH=1.57.

The detailed optical data of the sixth embodiment is shown in FIG. 17 (TABLE 11), and the aspheric surface data is shown in FIGS. 18A and 18B (TABLES 12A and 12B), wherein the units of the radius of curvature, the thickness and the focal length are expressed in mm, and HFOV is half of the maximal field of view.

It is to be noted that TABLES 1-12 (illustrated in FIGS. 7-18 respectively) show different data of the different embodiments, however, the data of the different embodiments are obtained from experiments. Therefore, any imaging lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 19) shows the data of the respective embodiments resulting from the equations.

What is claimed is:

1. An imaging lens assembly comprising five lens elements with refractive power, in order from an object side to an image side:
   a first lens element with positive refractive power having a convex object-side surface;
   a second lens element with negative refractive power;
   a third lens element having a concave object-side surface;
   a fourth lens element with positive refractive power having a convex image-side surface, at least one of the object-side and image-side surfaces thereof being aspheric; and
   a fifth lens element with negative refractive power having a concave image-side surface on which at least one inflection point is formed; wherein the imaging lens assembly further comprises an aperture stop disposed between the imaged object and the second lens element, and an electronic sensor for image formation; and wherein a distance on the optical axis between the aperture stop and the electronic sensor is SL, a distance on the optical axis between the object-side surface of the first lens element and the electronic sensor is TTL, a distance between the object-side surface of the first lens element and the image-side surface of the fifth lens element is Td, a focal length of the imaging lens assembly is f, and they satisfy the relations: $0.75<SL/TTL<1.20$, $0.70<Td/f\leq0.79$.

2. The imaging lens assembly according to claim 1, wherein the second lens element has a concave image-side surface, the object-side and image-side surfaces of the fifth lens element are aspheric, and the fifth lens element is made of plastic material.

3. The imaging lens assembly according to claim 2, wherein the fourth lens element has a concave object-side surface.

4. The imaging lens assembly according to claim 3, wherein a focal length of the first lens element is f1, and f and f1 satisfy the relation: $0.40<f1/f<0.80$.

5. The imaging lens assembly according to claim 4, wherein the focal length of the first lens element is f1, and f and f1 satisfy the relation: $0.50<f1/f<0.70$.

6. The imaging lens assembly according to claim 4, wherein a thickness on the optical axis of the second lens element is CT2, and f and CT2 satisfy the relation: $0.30<(CT2/f)*10<1.00$.

7. The imaging lens assembly according to claim 4, wherein an Abbe number of the first lens element is V1, an Abbe number of the second lens element is V2, and they satisfy the relation: $25.0<V1-V2<45.0$.

8. The imaging lens assembly according to claim 7, wherein the Abbe number of the first lens element is V1, the Abbe number of the second lens element is V2, and they satisfy the relation: $30.5<V1-V2<42.0$.

9. The imaging lens assembly according to claim 7, wherein a radius of curvature of the object-side surface of the first lens element is R1, and f and R1 satisfy the relation: $0.25<R1/f<0.45$.

10. The imaging lens assembly according to claim 7, wherein an aperture stop is disposed between the first lens element and the second lens element; wherein a distance on the optical axis between the aperture stop and the electronic sensor is SL, a distance on the optical axis between the object-side surface of the first lens element and the electronic sensor is TTL, and they satisfy the relation: $0.75<SL/TTL<0.92$.

11. The imaging lens assembly according to claim 3, wherein the focal length of the first lens element is f1, the focal length of the fourth lens element is f4, and they satisfy the relation: $0.80<f1/f4<1.40$.

12. The imaging lens assembly according to claim 3, wherein a distance on the optical axis between the first lens element and the second lens element is T12, and f and T12 satisfy the relation: $0.05<(T12/f)*10<0.85$.

13. The imaging lens assembly according to claim 2, wherein the Abbe number of the first lens element is V1, the Abbe number of the second lens element is V2, the Abbe number of the third lens element is V3, and they satisfy the relation: $15.0<V1-((V1+V2+V3)/3)<30.0$.

14. The imaging lens assembly according to claim 2, wherein the fifth lens element has a concave object-side surface.

15. The imaging lens assembly according to claim 1, wherein the distance on the optical axis between the object-side surface of the first lens element and the electronic sensor is TTL, half of the diagonal length of the effective pixel area of the electronic sensor is ImgH, and they satisfy the relation: TTL/ImgH<1.95.

16. An imaging lens assembly comprising five lens elements with refractive power, in order from an object side to an image side:
   a first lens element with positive refractive power having a convex object-side surface;
   a second lens element with negative refractive power having a concave image-side surface;
   a third lens element having a concave object-side surface and a convex image-side surface;
   a fourth lens element with positive refractive power having a concave object-side surface and a convex image-side surface, at least one of the object-side and image-side surfaces thereof being aspheric; and
   a fifth lens element with negative refractive power having a concave image-side surface on which at least one inflection point is formed, at least one of the object-side and image-side surfaces thereof being aspheric; and wherein there is an air distance between the first lens element and the second lens element, and the distance on the optical axis between the first lens element and the second lens element is T12, a distance between the object-side surface of the first lens element and the image-side surface of the fifth lens element is Td, a focal length of the imaging lens assembly is f, and they satisfy the relations: $0.05<(T12/f)*10<0.85$, $0.70<Td/f\leq0.79$.

17. The imaging lens assembly according to claim 16, wherein the fifth lens element has a concave object-side surface and is made of plastic material.

18. The imaging lens assembly according to claim 16, wherein a radius of curvature of the object-side surface of the first lens element is R1, and f and R1 satisfy the relation: $0.25 < R1/f < 0.45$.

19. The imaging lens assembly according to claim 18, wherein a thickness on the optical axis of the second lens element is CT2, and f and CT2 satisfy the relation: $0.30 < (CT2/f)*10 < 1.00$.

20. The imaging lens assembly according to claim 16, wherein the Abbe number of the first lens element is V1, the Abbe number of the second lens element is V2, and they satisfy the relation: $30.5 < V1-V2 < 42.0$.

21. The imaging lens assembly according to claim 16, wherein the Abbe number of the first lens element is V1, the Abbe number of the second lens element is V2, the Abbe number of the third lens element is V3, and they satisfy the relation: $15.0 < V1-((V1-V2+V3)/3) < 30.0$.

22. The imaging lens assembly according to claim 16, wherein the imaging lens assembly further comprises an aperture stop disposed between the imaged object and the second lens element, and an electronic sensor for image formation; wherein a distance on the optical axis between the aperture stop and the electronic sensor is SL, a distance on the optical axis between the object-side surface of the first lens element and the electronic sensor is TTL, and they satisfy the relation: $0.75 < SL/TTL < 1.20$.

23. The imaging lens assembly according to claim 18, wherein the imaging lens assembly further comprises an electronic sensor for image formation, the distance on the optical axis between the object-side surface of the first lens element and the electronic sensor is TTL, half of the diagonal length of the effective pixel area of the electronic sensor is ImgH, and they satisfy the relation: $TTL/ImgH < 1.95$.

* * * * *